June 29, 1954 R. W. HUTTON 2,682,577

DISCRIMINATING CIRCUITS FOR DUAL-PURPOSE TRUNKS

Filed Nov. 5, 1951 10 Sheets-Sheet 1

INVENTOR:
ROBERT W. HUTTON
BY John J. Bellamy
ATTORNEY

DISCRIMINATING CIRCUITS FOR DUAL-PURPOSE TRUNKS

INVENTOR:
ROBERT W. HUTTON
BY John J. Bellamy
ATTORNEY

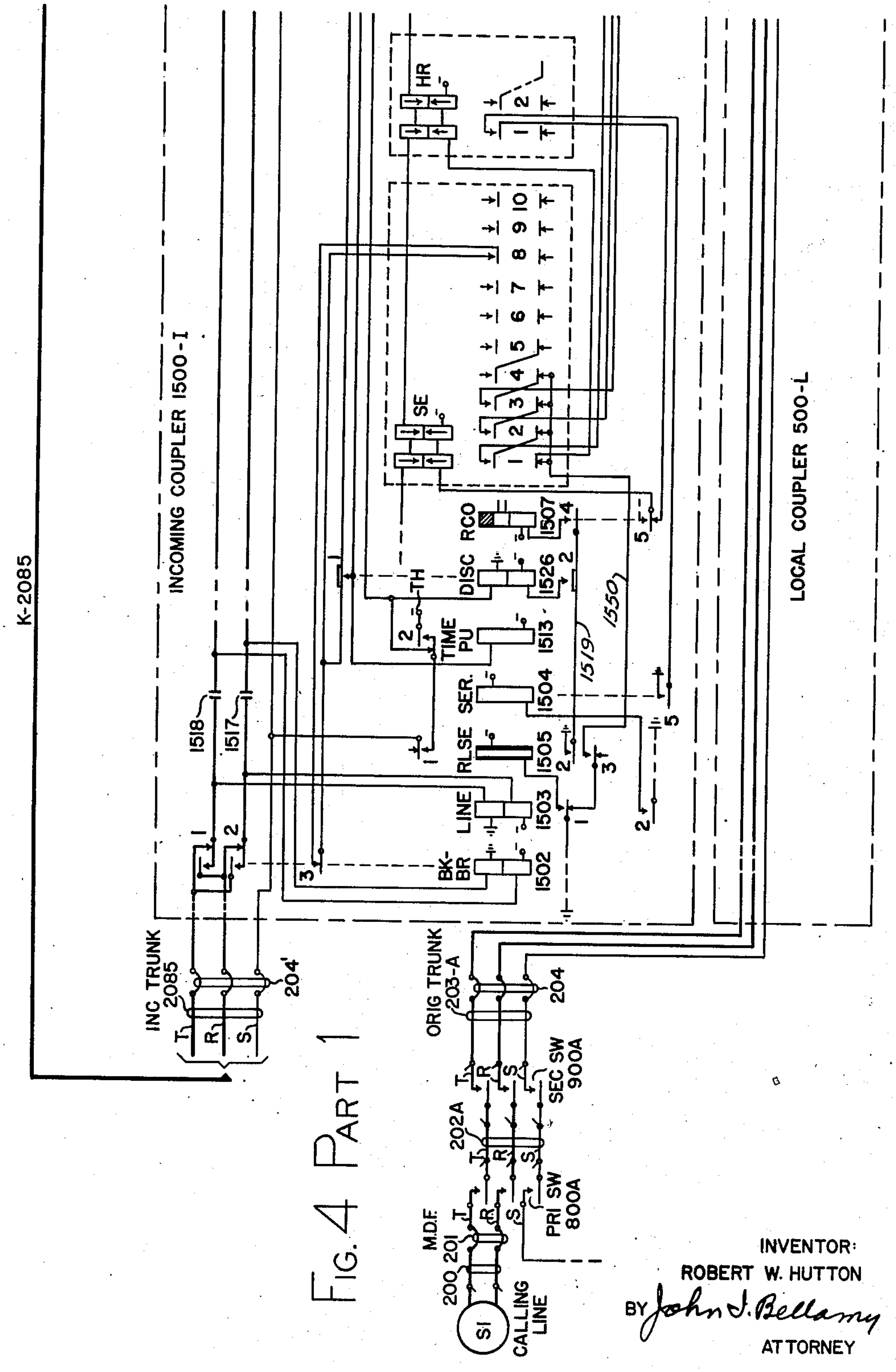
FIG. 4 PART 1
INVENTOR:
ROBERT W. HUTTON
BY John J. Bellamy
ATTORNEY

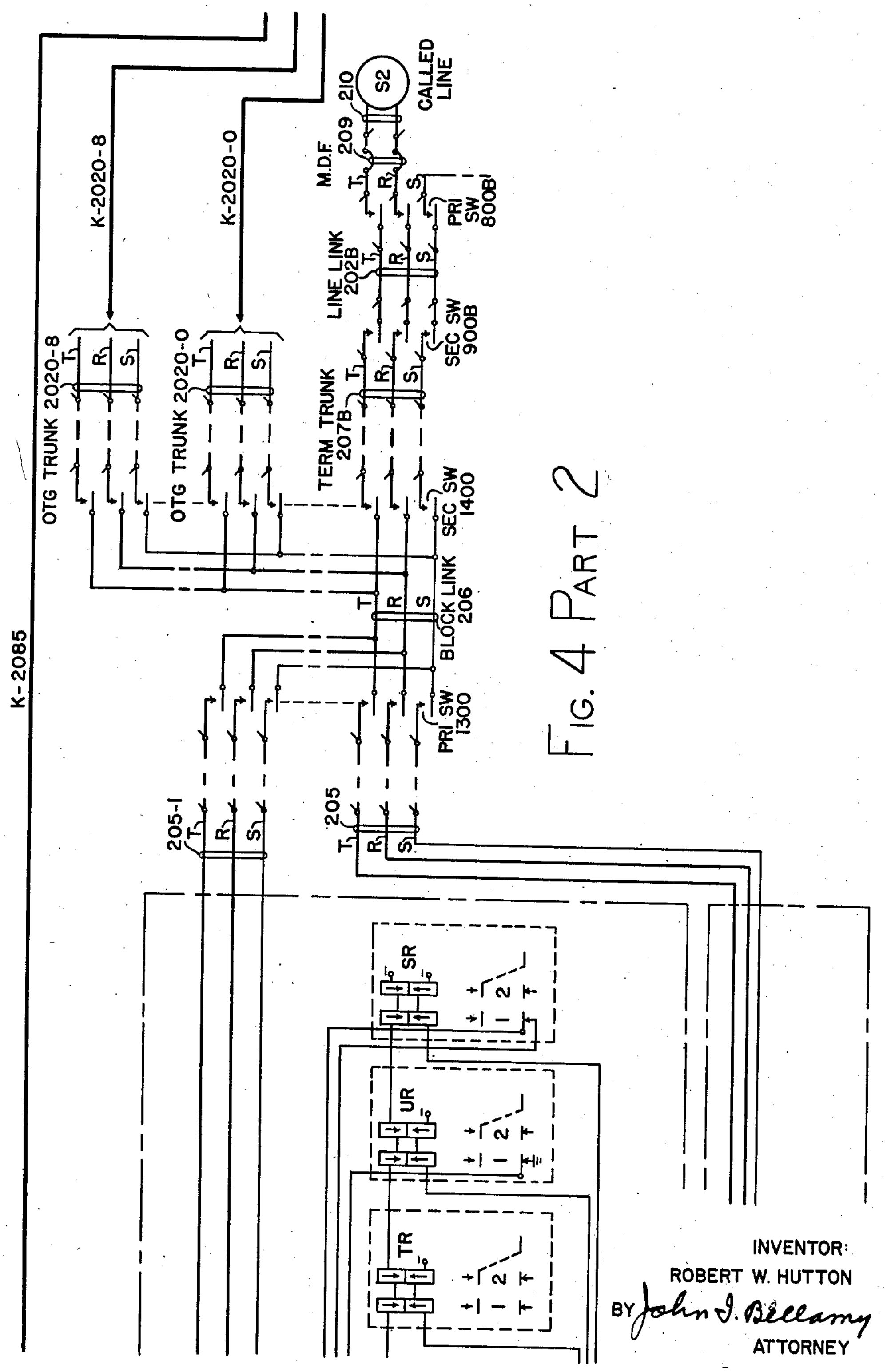
FIG. 4 PART 2
INVENTOR:
ROBERT W. HUTTON
BY John J. Bellamy
ATTORNEY

INVENTOR:
ROBERT W. HUTTON
BY John J. Bellamy
ATTORNEY

June 29, 1954 R. W. HUTTON 2,682,577

DISCRIMINATING CIRCUITS FOR DUAL-PURPOSE TRUNKS

Filed Nov. 5, 1951 10 Sheets-Sheet 6

INVENTOR:
ROBERT W. HUTTON
BY John I. Bellamy
ATTORNEY

June 29, 1954 R. W. HUTTON 2,682,577

DISCRIMINATING CIRCUITS FOR DUAL-PURPOSE TRUNKS

Filed Nov. 5, 1951 10 Sheets-Sheet 7

INVENTOR:
ROBERT W. HUTTON
BY John J. Bellamy
ATTORNEY

June 29, 1954 R. W. HUTTON 2,682,577

DISCRIMINATING CIRCUITS FOR DUAL-PURPOSE TRUNKS

Filed Nov. 5, 1951 10 Sheets-Sheet 8

INVENTOR:
ROBERT W. HUTTON
BY John D. Bellamy
ATTORNEY

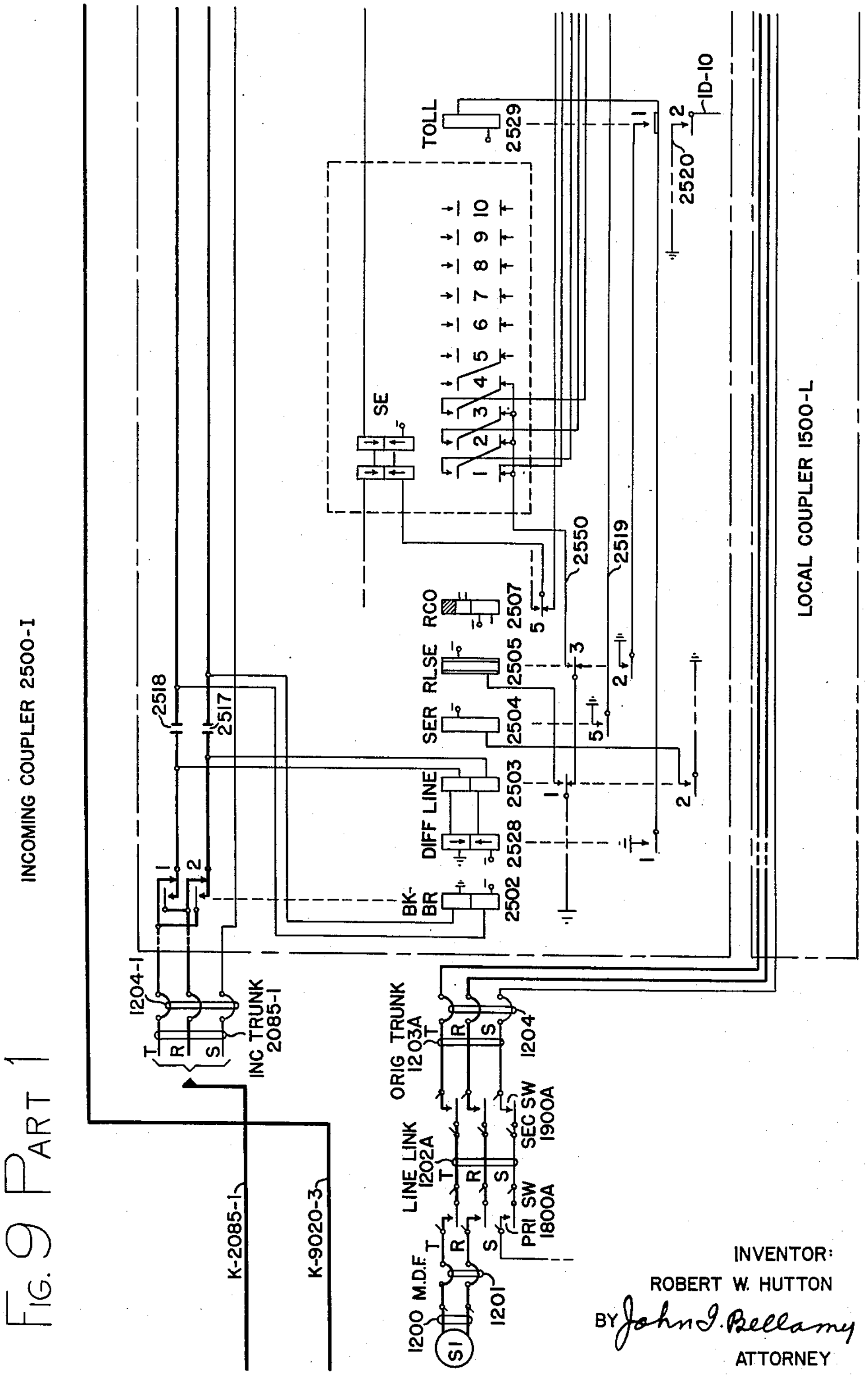
FIG. 9 PART 1
INVENTOR:
ROBERT W. HUTTON
BY John D. Bellamy
ATTORNEY

June 29, 1954 R. W. HUTTON 2,682,577
DISCRIMINATING CIRCUITS FOR DUAL-PURPOSE TRUNKS
Filed Nov. 5, 1951 10 Sheets-Sheet 10
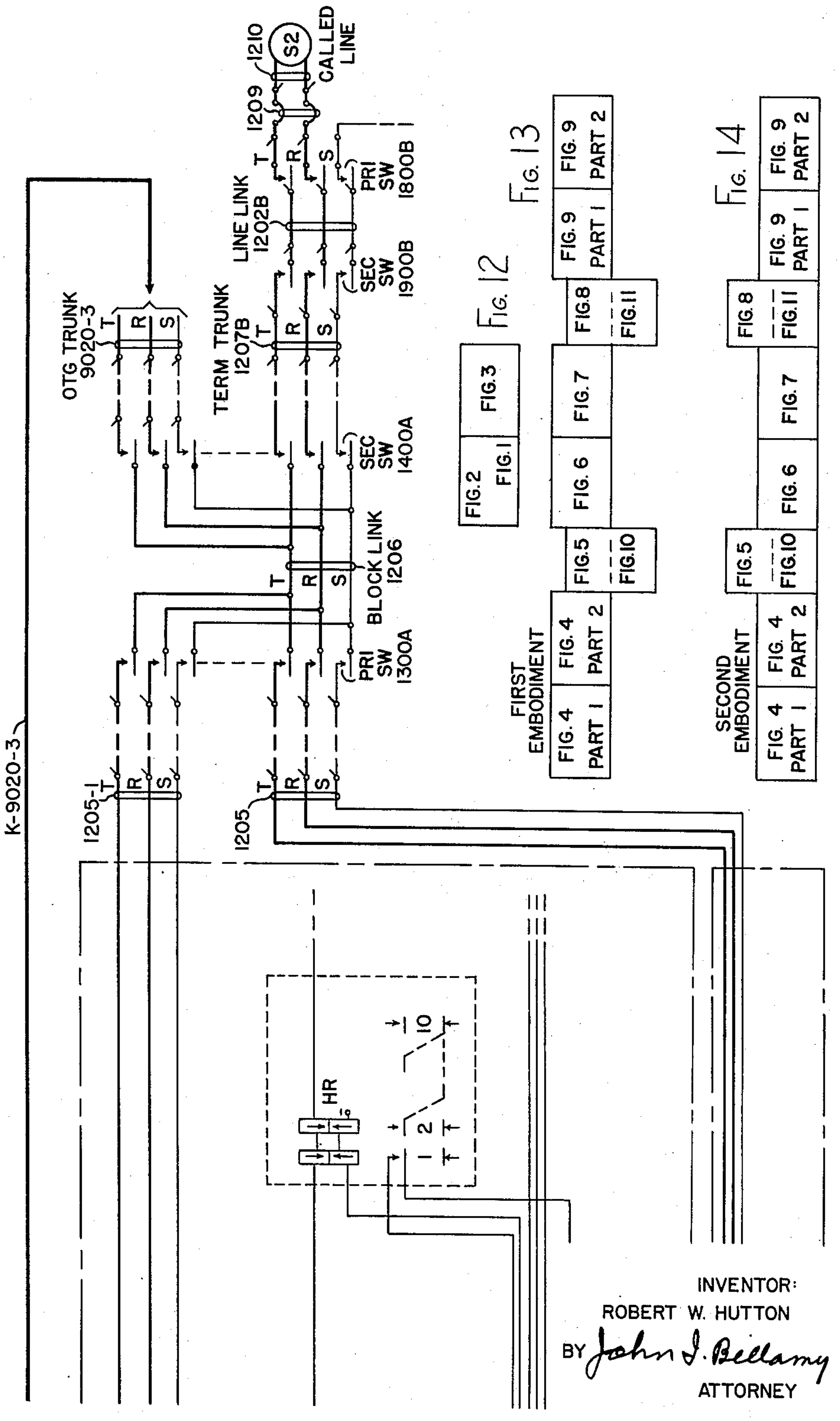
FIG. 9 PART 2, FIG. 12, FIG. 13, FIG. 14
INVENTOR:
ROBERT W. HUTTON
BY John J. Bellamy
ATTORNEY Patented June 29, 1954

2,682,577

UNITED STATES PATENT OFFICE 2,682,577

DISCRIMINATING CIRCUITS FOR DUAL-PURPOSE TRUNKS

Robert W. Hutton, Chicago, Ill., assignor, by mesne assignments, to International Telephone and Telegraph Corporation, a corporation of Maryland Application November 5, 1951, Serial No. 254,843

7 Claims. (Cl. 179—18)

This invention relates to discriminating circuits for dual-purpose trunks such as are used in telephone switching systems. Its general object is to provide new and improved discriminating terminal circuits for trunks of the indicated character which permit a single trunk group to effectively replace two trunk groups.

One specific object is to provide terminal circuits for a trunk interconnecting two automatic telephone exchanges and so arranged that a call thereover from the first exchange may be directed to either of two locations in the second exchange according to the designation dialed to reach the trunk in the first exchange.

Another specific object is to provide terminal circuits for an interexchange trunk for causing a connection over the trunk to be controlled in the second exchange according to the class of the call, as whether from a subscriber or from a toll operator.

A further object is to provide terminal circuits of the indicated character for trunks using derived dialing circuits, including composited and simplexed trunks.

A feature of one embodiment of the invention is that the required directional or class-indicating information is passed to the second exchange according to the polarity employed in the first exchange to energize the dialing circuit, and that the polarity used in the second exchange to relay answered supervision back to the first exchange is selected to agree with polarity applied to the dialing circuit in the first exchange.

A related further feature concerns changing the polarity of the dialing circuit, following its closure on seizure of the trunk in the first exchange, without causing a false operation of the incoming dialing relay in the second exchange.

A feature of a second embodiment is that the required directional or class information is passed to the second exchange accordance to whether or not a voice-frequency signal is transmitted over the talking path, as distinct from a signal over the dialing circuit.

Other objects and features of the invention will become apparent as the description progresses.

I. GENERAL DESCRIPTION

It has been chosen to illustrate the invention as embodied in a group of exchanges including two automatic telephone exchanges located comparatively close together, rendering it economical to provide service between them on a local basis, and to issue a single directory covering both exchanges. The switching apparatus must therefore be so arranged that the telephone numbers are the same when called from either exchange.

In the chosen illustration, a toll board is located in the same building which houses the second of the noted automatic exchanges. The calls in either direction between the two exchanges are handled over a single group of trunks, and the length of these trunks is assumed to be great enough to render it economical to use them as two-way trunks, rather than as two one-way groups.

With the two exchanges and the toll board bearing respective single-digit designations (such as "3," "8," and "0," respectively), the single group of interexchange trunks can handle all calls from the first exchange only if it is arranged that a trunk of the group is seized in the first exchange responsive to dialing the designation of either the second exchange or the toll board, and if the call be selectively directed in the second exchange according to the designation dialed in the first exchange.

Since some distinction is required in practice to be made in the handling of a call from the second exchange to the first, according to whether the call is from the toll board or from a line of the second exchange, a single group of trunks can be used for calls in the concerned direction only if it is arranged that apparatus in the first exchange responds selectively according to whether the call is a toll call or a call from a subscriber of the second exchange.

IA. *The drawings*

The accompanying drawings, comprising Figs. 1 to 14, disclose two embodiments of a telephone system according to the invention.

Fig. 1 shows three interconnected exchanges A, B, and C, and with exchanges A and B comprising the first and second exchanges above referred to;

Figs. 2 and 3 are single-line block diagrams illustrating the switching apparatus employed in exchanges A and B, respectively;

Figures 1, 2:
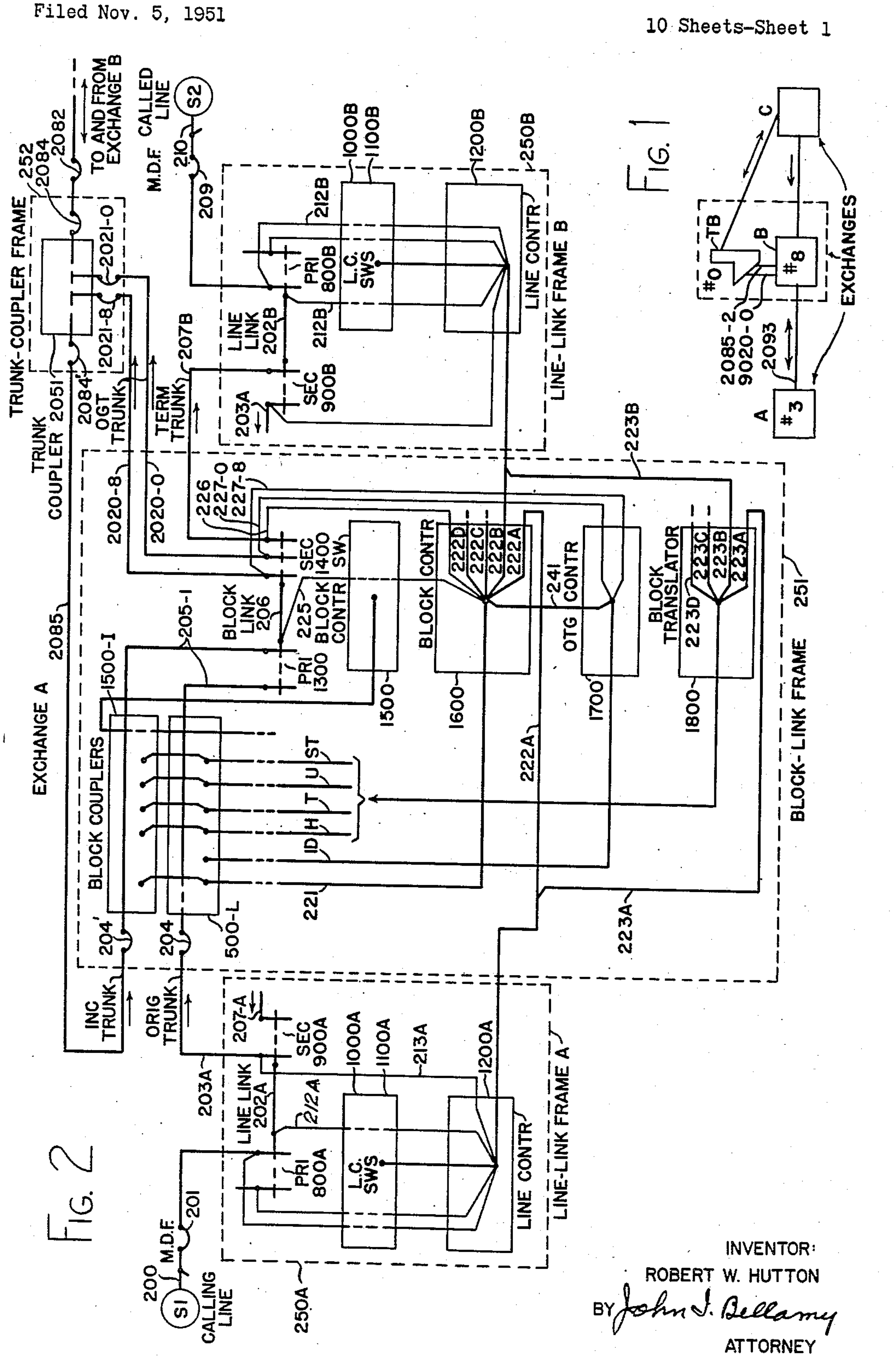
Figure 3:
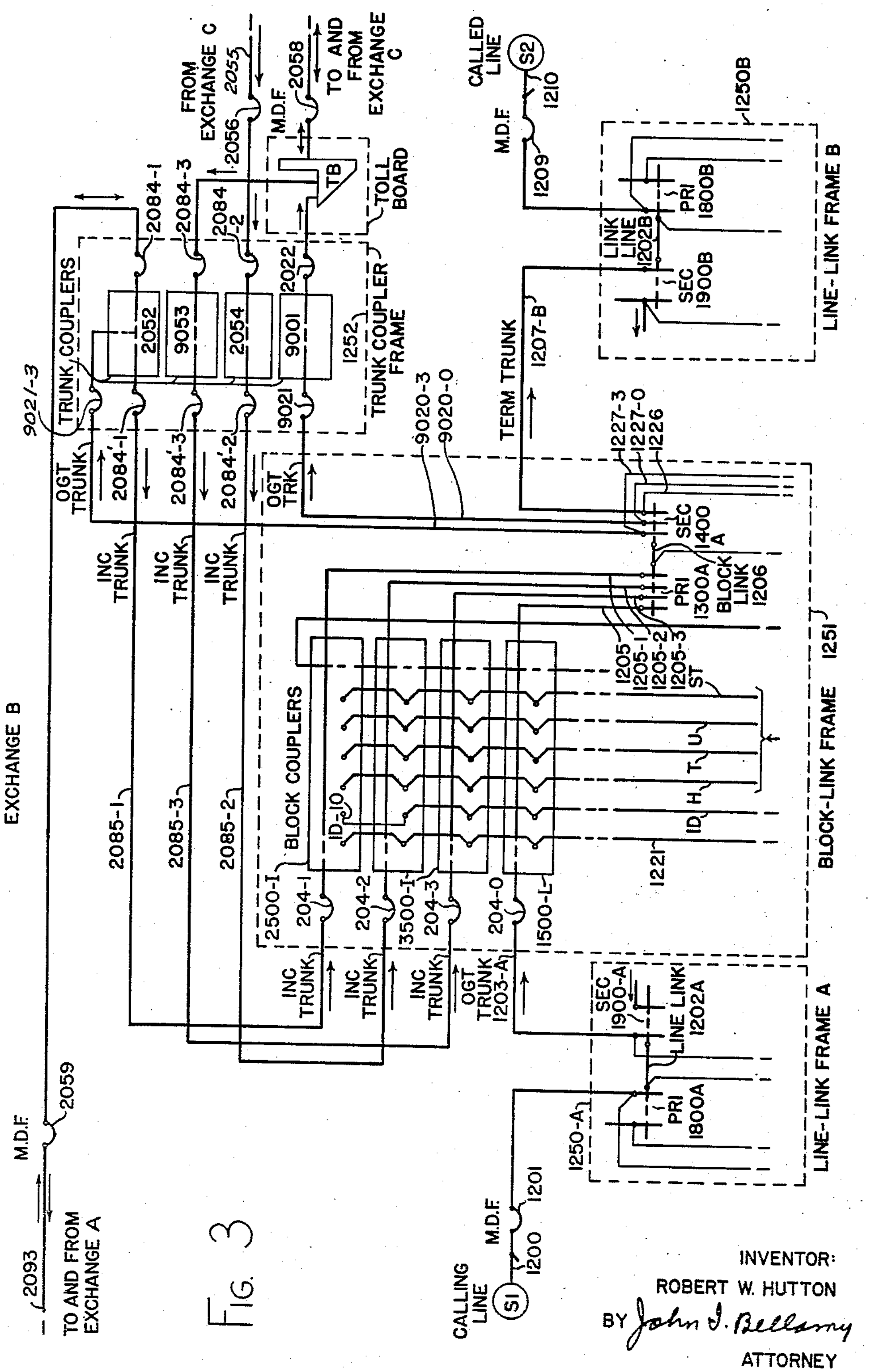
Figure 10:
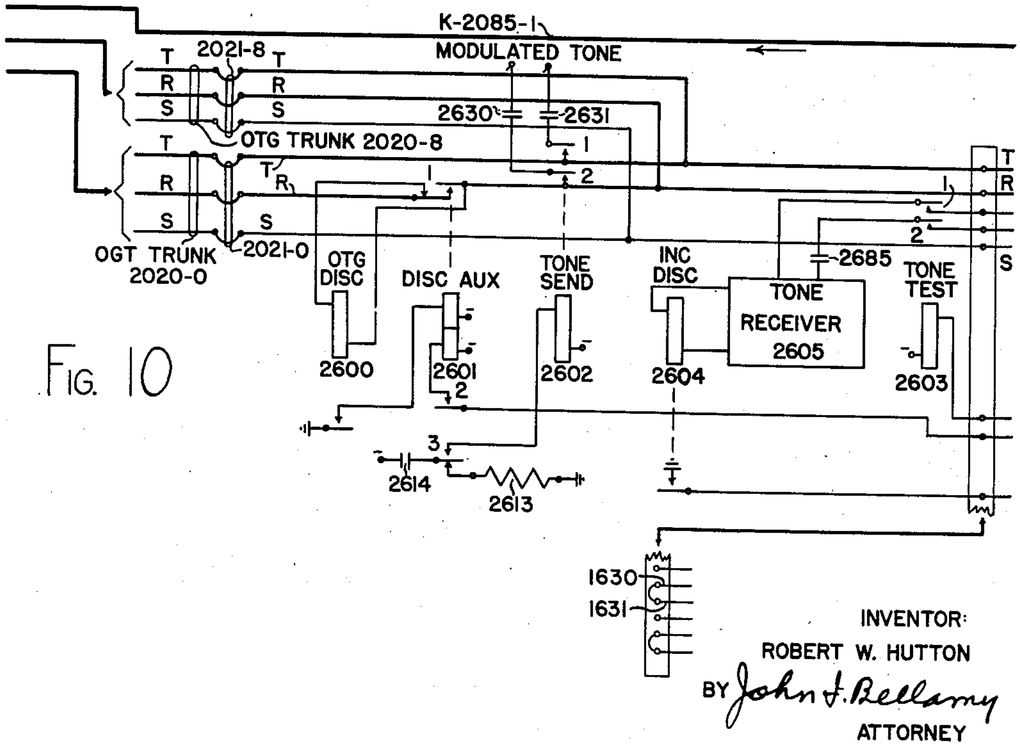
Figure 11:
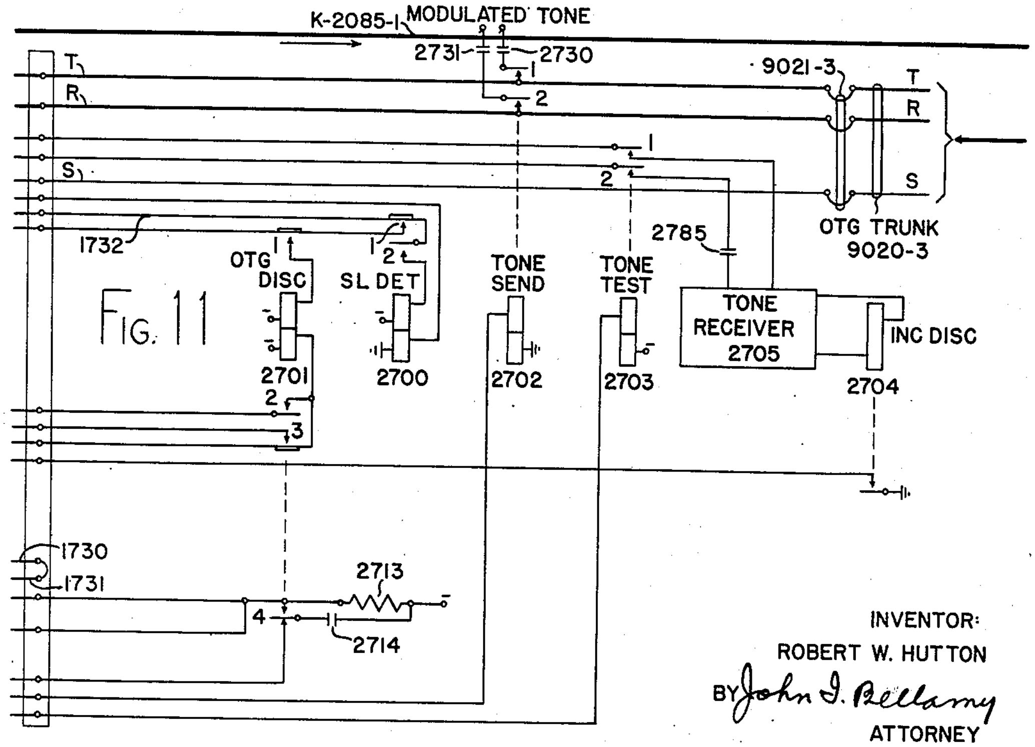

Figs. 4 through 9, taken together, comprise generally a redrawing of Figs. 2 and 3, to show in more detail the circuit paths and intimately associated electrical equipment employed in the extension of talking connections between these various exchanges;

Figs. 10 and 11 show modifications of the circuit apparatus of Figs. 2 to 9; and Figs. 12 to 14, located on the same sheet of drawings as Figs. 9, part 2, show the way in which the sheets of drawings on which Figs. 1 to 11 are drawn, should be arranged in order to be understood best.

Figure 5:
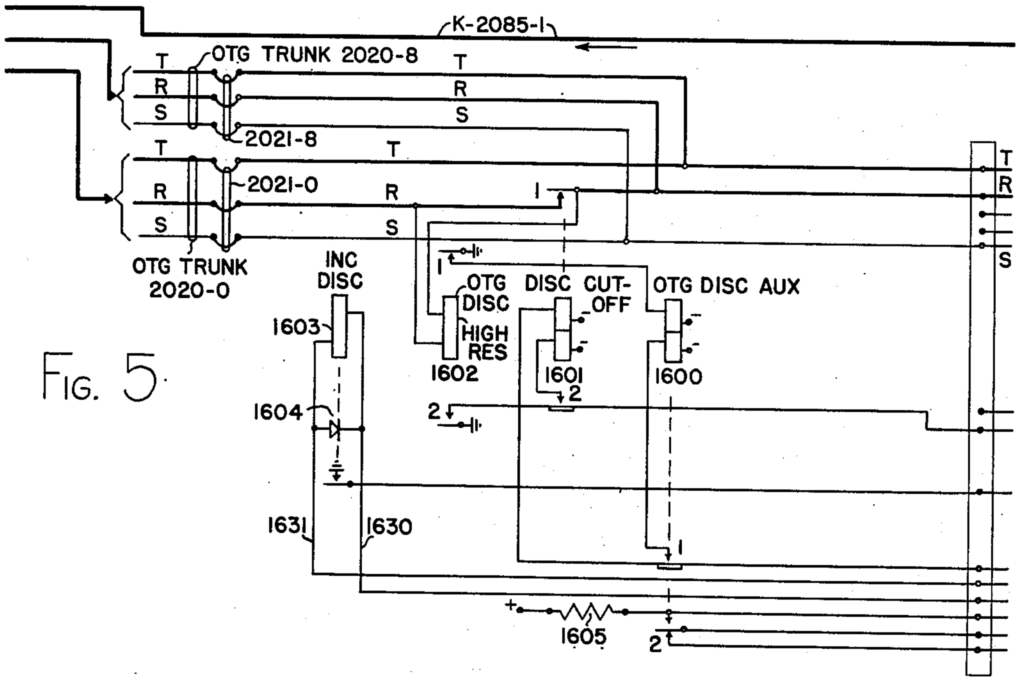
Figure 6:
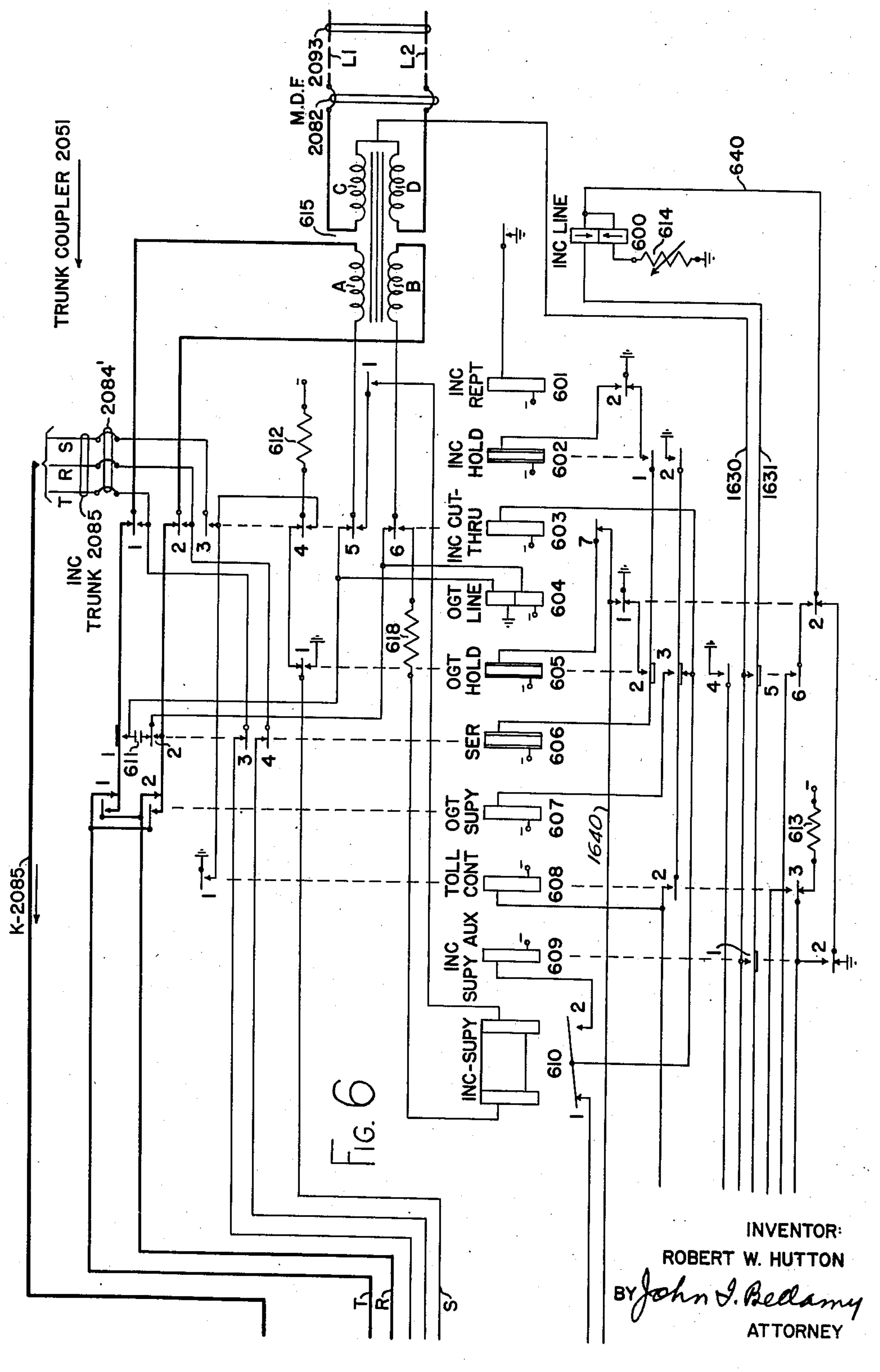
Figure 7:
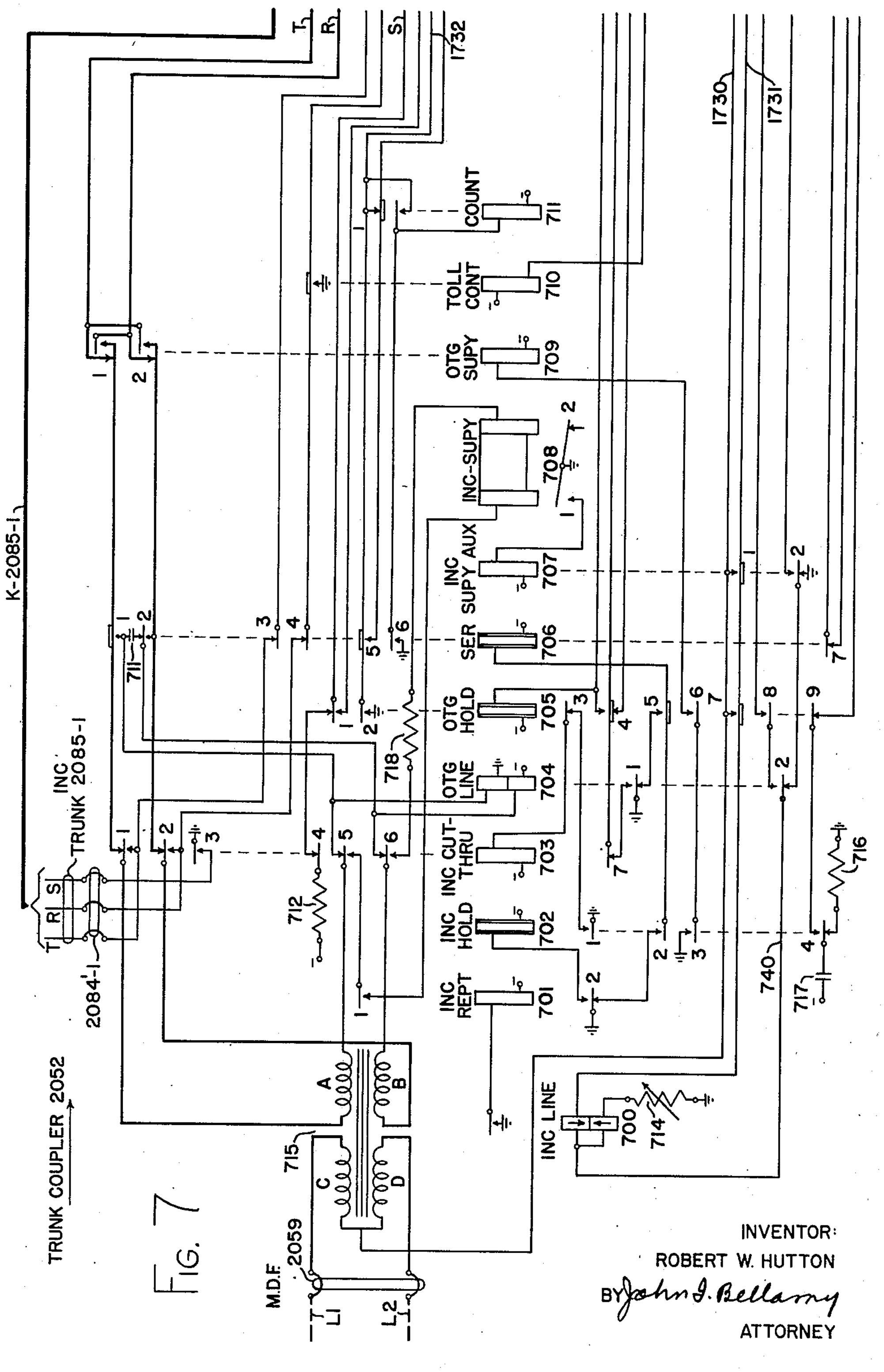
Figure 8:
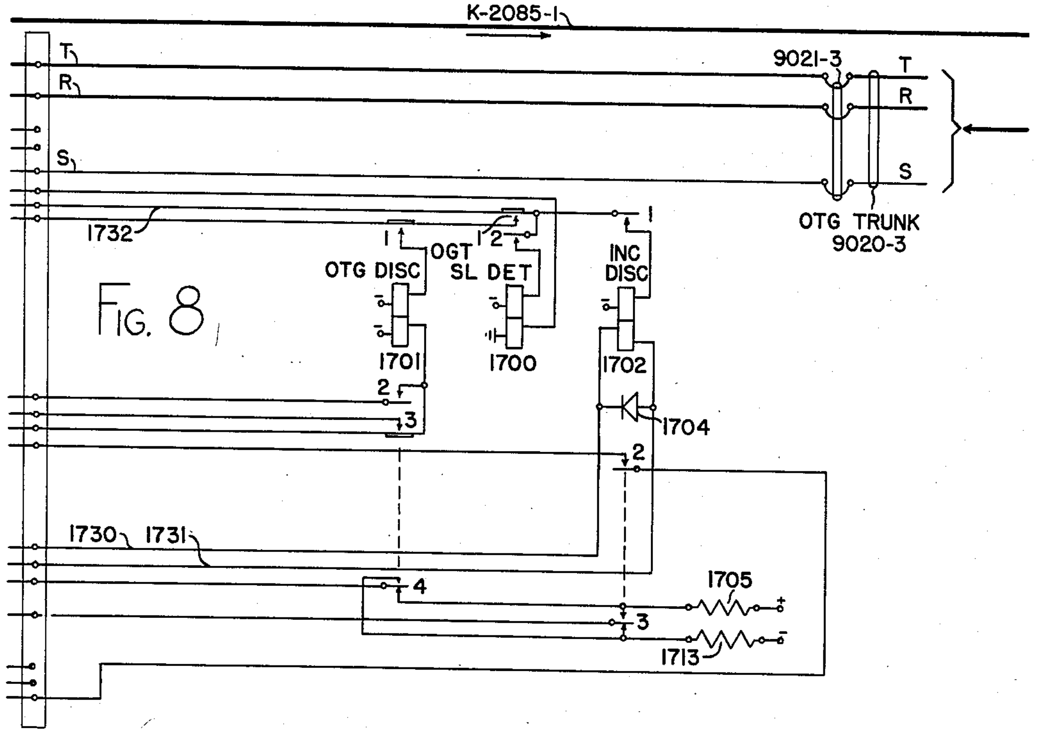

Referring to Figs. 4 to 9, Fig. 4, parts 1 and 2, show in circuit detail the switchboard apparatus of exchange A;

Figs. 5 and 6, taken together, disclose in circuit detail the apparatus of the trunk coupler of exchange A;

Figs. 7 and 8, taken together, disclose in circuit detail the apparatus of the trunk coupler of exchange B; and Fig. 9, parts 1 and 2, disclose in circuit detail the switchboard apparatus of exchange B.

Referring to Figs. 10 and 11, Fig. 10, replacing Fig. 5, shows in circuit detail a second embodiment of the trunk coupler of exchange A; and Fig. 11, replacing Fig. 8, shows in circuit detail a second embodiment of the trunk coupler of exchange B.

Fig. 1 shows three exchanges A, B, and C, with a toll board TB associated with exchange B. Calls among these exchanges and the toll board are handled over the indicated trunk groups, comprising two-way group 2083, one-way groups 9020-0 and 2085-2, a two-way group between TB and C, and a one-way group from C to B. The calls over the trunk groups shown connected to C are assumed to be exclusively toll calls, handled through the usual toll board (not shown) in exchange C.

Referring now to Fig. 2, the switchboard apparatus of exchange A is of the crossbar type disclosed in the application of Bellamy and Bowser, Serial No. 85,292, filed April 24, 1949, for a Primary-Secondary-Spread Crossbar Telephone System. It includes a main distributing frame, M. D. F., through which lines and trunks are connected with the switchboard apparatus; line-link frames A, B, C, and D, of which line-link frames A and B are shown at 250A and 250B; a block-link frame shown at 251; and a trunk coupler frame shown at 252.

The general purpose of the switching apparatus of exchange A is to interconnect the subscriber lines of exchange A with each other, and with the inter-exchange trunk line as desired, as well as to interconnect the inter-exchange trunk line to subscribers as desired.

As hereinbefore pointed out, the invention is embodied in a system as disclosed in the noted Bellamy and Bowser application. The line-link frames A and B, and the block-link frame with the exception of the incoming block coupler and the trunk coupler is as disclosed and described in the noted application. Incoming block coupler 1500-I and trunk coupler 2051 will be described in detail hereinafter.

IB1. *Local call—exchange A*

Briefly, the operations involved in extending a call from the subscriber at station S1 on calling line 200 to the subscriber at station S2 on called line 210, is as follows:

The subscriber at station S1 removes his receiver and dials the directory number of station S2, comprising the listed initial digit "3," followed by the listed hundreds, tens, units, and stations digits of the number. As pointed out in the noted application, line controller switches 1000A and 1100A operate to associate line controller 1200A with line-link primary switch 800A, at which the calling line terminates. A line-link, such as line-link 202A and an originating trunk such as originating trunk 203A are tested over respective conductors 212A and 213A. If found idle, the line controller matches an idle path from the calling line to an idle block coupler, such as local block coupler 500-L. Thereafter, the line controller causes the primary and secondary switches 800A and 900A to effect the mechanical selection of the matched line-link 202A and causes the associated hold-magnet (not shown) to close the appropriate stackup of contact members in these switches to extend the calling line to local block coupler 500-L. The line controller switches and the line controller are now released, leaving calling line 200 connected to local block coupler 500-L by way of line-link 202A, originating trunk 203A, and block coupler jumper 204.

As described in the noted application, following the dialing of the directory number of a local subscriber, local block coupler 500-L causes block controller switch 1500 to associate block controller 1600 with primary switch 1300 which is associated with block coupler 500-L over conductors in group 205. At the same time, block coupler 500-L is associated with block controller 1600 over the conductors in group 221, and block translator 1800 receives the registered digit information over conductor groups H, T, U, and ST.

The block translator thereupon determines the line-link frame which serves the called line (line-link frame B) and transmits thereto (over conductors in group 223B) translated digit information indicating the primary switch (800B) which serves the called line, and indicates the specific vertical appearance of the called line on that primary switch. The line controller 1200B causes the line controller switches 1000B and 1100B to position themselves according to the switchboard location of the called line. The line-links (such as 202B) are now tested over respective conductors in group 212B and this testing information is imparted to block controller 1600 over respective conductors in group 222B. The sleeve conductor 211B of the called line 210 is extended to block controller 1600 over conductors in group 222B permitting the block controller to test the called line as to its busy or idle condition. If the line tests idle, the block controller matches an idle path thereto over a block-link such as block-link 206, a terminating trunk such as terminating trunk 207B and a line-link such as line-link 202B. These block links and terminating trunks are tested over respective conductors 225 and 226. Once an idle path between block coupler 500-L and the called line has been determined, the block controller extends the connection from the associated block coupler to the called line by operating block primary switch 1300, block secondary switch 1400, line-link secondary switch 900B and line-link primary switch 800B. The local block coupler applies ringing current to signal the called station S2. The items of common apparatus are now returned to common use leaving the connection intact between the calling line and the called line.

When the call has been answered, the subscribers at stations S1 and S2 may converse. When both subscribers have replaced their receivers, the existing connection is broken at each of the switches 800A, 900A, 1300, 1400, 900B and 800B.

IB2. *Exchange A calls exchange B*

When the subscriber at station S1 on line 200 desires to call the subscriber at exchange B, he removes his receiver and dials the directory number of the desired subscriber. This directory number includes an initial digit "8" which is assigned specifically to lines of exchange B.

As previously described when the receiver is removed at the calling station S1, the calling line is extended to an idle block coupler such as local block coupler 500-L.

When the initial digit "8" is dialed, a connection is immediately completed over a wire in initial digit group ID for calling in outgoing controller 1700 for setting it with specific regards to the trunk group leading to the called exchange B. Block controller 1600 and block controller switches 1500, together with outgoing controller 1700, cause block-link primary switch 1300 and secondary switch 1400 to extend the connection to an idle trunk in the called trunk group.

If block-link 206 and the outgoing trunks such as outgoing trunks 2020-8 and 2020-0 are idle (as shown by a test made over respective conductors 227-8 and 227-0), block controller 1600 causes switches 1300 and 1400 to extend the connection from block coupler 500-L to trunk 2020-8 or 2020-0, depending on the initial digit dialed.

The calling line is thereby extended through block coupler 500-L to trunk coupler 2051 on trunk coupler frame 252. Since the call is to a local subscriber at exchange B, (indicated by the initial digit "8") the trunk coupler 2051 repeats the pulses of the remaining digits over the trunk line to the apparatus in exchange B, as will hereinafter be described.

The connection established by the calling line to the outgoing trunk is released responsive to operations occurring in the trunk coupler 2051 when the receiver is subsequently replaced at the calling station S1.

When exchange A is called from exchange B, the call reaches exchange A over a two-way trunk line such as 2093. This trunk line is extended through jumpers 2082 and 2084 to trunk coupler 2051. Trunk coupler 2051 extends the connection to block coupler 1500-I over incoming trunk 2085 and jumpers 204′ and 2084′.

Block coupler 1500-I is similar to local block coupler 500-L except that it preferably does not apply dial tone upon being taken for use nor does it have any provisions for receiving any initial digit.

Following the seizure of incoming block coupler 1500-I, the call may be directed only to local subscribers in exchange A by the dialing of the appropriate directory number (block coupler 1500-I does not have an initial digit register therefore calls incoming over incoming trunk 2085 can not reach a trunk level). The connection is extended to the called line 210 and station S2 thereon in the manner previously described for a call originated at calling station S1. The operation of incoming block coupler 1500-I will be described in greater detail hereinafter.

Referring now to Fig. 3 it will be observed that the switchboard apparatus of exchange B is generally similar to that of exchange A as shown in Fig. 2. However, portions of the common apparatus have been omitted but their operation is as described with reference to corresponding apparatus of Fig. 2.

IC1. *Local call—exchange B*

The subscriber at station S1 on line 1200 may call the subscriber at station S2 on line 1210 in the manner previously described with reference to the subscriber at station S1 on line 200 calling the subscriber station S2 on line 210.

IC2. *Exchange B calls exchange A*

If the calling subscriber S1 on line 1200 desires a local subscriber in exchange A, the removal of the receiver causes the common apparatus of line-link frame A, shown at 125°A, to associate the calling line with an idle block coupler such as local block coupler 1500-L. Following the dialing of the initial digit "3," the common equipment of the block-link frame, shown at 1251, causes block-primary and block-secondary switches 1300 and 1400 to associate the concerned block coupler with an idle outgoing trunk, such as outgoing trunk 9020-3, over conductors in group 1205. Block coupler 1500-L is now connected to trunk coupler 2052 through jumper 9021-3. Trunk coupler 2052 seizes the associated trunk coupler 2051 of exchange A over trunk line 2093 and the associated main distributing frame jumpers 2082 and 2059.

The calling subscriber S1 at exchange B thereupon dials the directory number of the desired subscriber in exchange A. As hereinbefore pointed out, incoming coupler 1500-I does not have an initial digit register, therefore, all calls from exchange B to exchange A can be only to local subscribers in exchange A.

ID1. *Exchange B calls toll board TB*

If the subscriber S1 on line 1200 desires to call the operator at the toll board, a block coupler such as local block coupler 1500-L is associated with the calling line as previously described. The dialing of the initial digit "0" causes the common equipment to associate the calling block coupler with outgoing trunk 9020-0 over conductors in group 1205 and through block primary and secondary switches 1300 and 1400. The connection is extended through jumper 9021 to trunk coupler 9001 which is extended to the toll board over jumper 2022. The calling station S1 on line 1200 may converse with the toll operator at the toll board.

Trunk couplers 9001, 9053 and 2054 are one-way trunks assumed to be similar to the outgoing repeater OR-1 shown in Fig. 8 of the drawings of Patent No. 2,427,650, issued to Pier Bakker for a Multi-Exchange Community Automatic Telephone System. Trunk OR-1 of the noted Bakker patent is a two-way trunk between a manual and automatic exchange, however, it will be assumed that trunk couplers 9001, 9053, and 2054 are similar to the one-way portion of the noted trunk repeater.

ID2. *Exchange A calls toll board TB*

Incoming calls from exchange A to the toll board TB reach the switchboard apparatus of exchange B through a main frame jumper such as jumper 2059 to reach trunk coupler 2052. The connection is extended through jumper 2084′-1 and associated incoming trunk 2085-1 to an incoming block coupler such as block coupler 2500-1 through block coupler jumper 204-1. The dialing of the initial digit "0," causes discrimination to take place in trunk coupler 2052, directing the call to an outgoing trunk such as outgoing trunk 9020-0, extending to the operator at the toll board TB without any further dialing on the part of the calling subscriber.

IE. *Toll call to exchange A or exchange B*

On calls from exchange C to exchange B, the connection is extended through main frame jumper 2056 to trunk coupler frame 1252. The connection thereupon reaches trunk coupler 2054 and is further extended to an incoming coupler such as incoming coupler 3500–I. The call may then be extended to exchange A if the initial digit "3" is dialed or it may be extended to a local subscriber in exchange B by dialing the desired directory number.

The operator at the toll board may originate an outgoing call or a terminating call by seizing trunk coupler 9053 which is associated with coupler 3500–I over an incoming trunk such as incoming trunk 2085–3. The operator may thereupon dial a digit "3" to reach exchange A or dial the directory number of any desired subscriber.

Trunk coupler 9001, 9053, and 2054 are one-way trunk repeaters and as hereinbefore described, may be as described and illustrated in the noted Pier Bakker application.

II. DETAILED DESCRIPTION

The invention having been described generally, a detailed description will now be given with reference to Figs. 4 through 9.

Fig. 4, parts 1 and 2, Fig. 5 and Fig. 6 disclose switchboard apparatus located in exchange A while Fig. 7, Fig. 8, and Fig. 9, parts 1 and 2, disclose switchboard apparatus of exchange B.

IIA. *Calls from exchange A to exchange B*

A detailed description of the operation of the system in extending talking connections from a local subscriber in exchange A to another local subscriber at exchange B and in extending a talking connection from a local subscriber in exchange A to the operator at exchange B, will now be given with particular reference to Figs. 4 through 9.

IIA1. *Station S1 on line 200 calls station S2 on line 1210*

The subscriber at station S1 on line 200 in exchange A, to call the subscriber at station S2 on line 1210 in exchange B, removes his receiver, waits for a dial tone from a local block coupler, such as block coupler 500–L, and then dials the trunk digit indexing exchange B, followed by the directory number of station S2 on line 1210.

As described in the noted Bellamy and Bowser application, when the receiver is removed at calling station S1, calling line 200 is associated with an idle local block coupler such as local coupler 500–L through the operation of the line controller switches and the line controller on the line-link frame containing the calling line. Station S1 on line 200 is connected to local block coupler 500–L through main frame jumper 201, through contacts on line-link primary switch 800–A, over a line-link such as line-link 202–A, through contacts on line-link secondary switch 900–A, over originating trunk 203–A and jumper 204.

As hereinbefore pointed out, block coupler 500–L is generally as described and disclosed in the noted Bellamy and Bowser application. Therefore, the dialing of the initial digit ("8") indexing an outgoing trunk to be used in reaching the desired local subscriber in exchange B causes the common apparatus of the switchboard at exchange A to extend the connection from block coupler 500–L over the tip, ring, and sleeve conductors of groups 205, through block-link primary switch 1300, over a block-link such as block-link 206, and through contacts on block-link secondary switch 1400 to outgoing trunk 2020–8 extending to trunk coupler 2051 over cable K–2020–8 and jumper 2021–8. The calling line loop is thereby extended to trunk coupler 2051.

In order for the calling line to be extended to trunk coupler 2051, the common apparatus in the outgoing controller tests the sleeve conductor of outgoing trunk 2020–8 and upon finding idle-indicating battery from idle-indicating resistor 612 through back contacts 4 and 1 of relays 603 and 605, respectively, of trunk coupler 2051, associates the calling line with the trunk coupler.

The line loop being closed across the tip and ring conductors extending to trunk coupler 2051, operates outgoing line relay 604 through back contacts 5 and 6 of incoming cut-through relay 603, the A and B windings of repeat coil 615, back contacts 1 and 2 of incoming cut-through relay 603, and break contacts 1 and 2 of outgoing supervisory relay 607.

Operation of outgoing line relay 604 causes ground potential to be placed to the winding of outgoing hold relay 605 through back contacts 7 of relay 603. Relay 605 operates and at its contacts 2 prepares a seizure circuit for seizing the trunk coupler at exchange B.

Operation of outgoing hold relay 605 removes the idle-indicating battery potential from the sleeve conductor of the calling line and replaces it with ground potential. Contacts 4 of outgoing hold relay 605 extend ground potential to the winding of toll discriminating cut-off relay 1601, operating it; contacts 5 place a shunt around the winding of relay 1603 and around its associated rectifier 1604; and contacts 6 extend negative battery potential from current-limiting resistor 613 through back contacts 3 of toll control relay 608, back contacts 2 of outgoing toll discriminating auxiliary relay 1600, over wire 1641 through make contacts 2 of outgoing relay 604, over wire 640 through the upper winding of incoming line relay 600, and over wires 1631 and 1630 through the C and D windings of repeat coil 615 to trunk wires L1 and L2 extending to exchange B.

Negative battery potential from current-limiting resistor 613 reaches exchange B over trunk wires L1 and L2, and is extended through the C and D windings of repeat coil 715 over wire 1730 to incoming toll discriminating relay 1702 and its associated rectifier 1704. The polarity of rectifier 1704 is such that it offers negligible resistance to current flow from negative battery potential appearing across the L1 and L2 conductors of the simplex line. This negative battery potential is therefore extended through rectifier 1704 to ground potential through the winding of incoming line relay 700 over wire 1731, and over wire 740 through back contacts 2 of relays 704 and 707, causing incoming line relay 700 to operate.

The incoming line relay 600 of Fig. 6 and incoming line relay 700 of Fig. 7 have double wound coils with their windings differentially connected. The lower windings are connected to ground potential through the associated variable resistors 614 and 714. The setting of these resistors are such that their resistance equals the impedance of the line. Therefore, if battery potential through resistor 613 is placed on wire 640, an equal amount of current flow passes through both windings of relay 600 preventing its operation as the flux generated in the windings is equal and opposite. However, incoming line relay 700 has its lower winding shunted by ground potential from contacts 2 of relay 707, hence battery potential appearing on wire 1731 energizes the upper winding of relay 700 only and operates it.

Operation of incoming line relay 700 causes ground potential to be extended to the winding of incoming repeat relay 701, operating it. Contacts 2 of relay 701 extend ground potential to the winding of incoming hold relay 702, operating it.

Operation of incoming hold relay 702 causes ground potential to be extended to the winding of incoming cut-through relay 703 through back contacts 3 of outgoing hold relay 705. Contacts 2 of incoming hold relay 702 prepare an operate circuit for series relay 706.

Incoming cut-through relay 703 operates and at its contacts 4 remove the idle-indicating battery from the sleeve conductor of outgoing trunk 9020-3; contacts 1 and 2 and 5 and 6, together with make contacts 1 of relay 701 place the windings of the polarized relay 708 (incoming supervisory) across the tip and ring conductors of incoming trunk 2085-1 extending to incoming coupler 2500-I over conductors in cable K-2085-1; contacts 3 place ground potential on the sleeve conductor of incoming trunk 2085-1; and contacts 7 open the operate circuit of relay 1701.

Incoming couplers 1500-I and 2500-I are incoming couplers similar to incoming coupler 500-I of the noted Bellamy and Bowser application. However, in both noted incoming couplers, the initial digit register and the reverting call relay have been omitted. The numbering of the relays in coupler 1500-I is similar to the numbering of the corresponding relays in coupler 500-I except for the additional prefix "1." In coupler 2500-I, the relay numbers are prefixed with the digit "2." Discriminating relay 1526 has been added to coupler 1500-I and differential relay 2528 and toll relay 2529 have been added to coupler 2500-I. The operation of these added relays will be described in full hereinafter.

The tip and ring conductors of incoming trunk 2085-1 are bridged by the windings of relay 708 in series with current-limiting resistor 718 and the A and B windings of repeat coil 715. This loop across the tip and ring conductors of incoming trunk 2085-1 is extended through break contacts 1 and 2 of back-bridge relay 2502, the winding of differential relay 2528 and the winding of line relay 2503 of incoming coupler 2500-1 to battery and ground potentials.

Differential relay 2528 having a double wound coil with the windings connected in opposing relationship will not operate as the current flow through both windings is equal and opposite. However, line relay 2503 operates from the current flowing and, as described in the noted Bellamy and Bowser application, at its contacts 1 and 2 operates release relay 2505 and series relay 2504 preparing incoming coupler 2500-I for receiving the dial pulses constituting the digits of the directory number of the desired subscriber S2 on line 1210.

As hereinbefore pointed out with reference to the noted Bellamy and Bowser application, the dialing of an initial digit assigned an outgoing trunk level causes the concerned block coupler to switch-through, extending the calling line loop across the tip and ring conductors of the outgoing trunk. Therefore, as the calling line loop is opened and closed by the dial, the loop across the tip and ring conductors of outgoing trunk 2020-3 is opened and closed.

The dialing of the directory number of the desired subscriber at station S2 on line 1210 by the calling subscriber S1 on line 200 causes outgoing line relay 604 of trunk coupler 2051 to restore and reoperate according to the dial pulses constituting the directory number of the desired subscriber as the block coupler has switched-through.

Contacts 2 of outgoing line relay 604 transfer wire 640 from battery potential to ground potential on each restoration, thereby generating battery and ground potential pulses. These battery and ground potential pulses are extended to incoming line relay 700 of trunk coupler 2052 over the noted path and over trunk line wires L1 and L2. At the same time, ground potential is extended through back contacts 1 of relay 604 and through make contacts 2 of outgoing hold relay 605 operating series relay 606 of trunk coupler 2051. Contacts 1 and 2 of relay 606 shunt the A and B windings of repeat coil 615 in order to improve dialing.

Incoming line relay 700 of trunk coupler 2052 responds to the battery and ground pulses received from trunk coupler 2051 by restoring and reoperating to repeat these pulses to the winding of incoming repeat relay 701 causing it to restore and reoperate accordingly.

Line relay 701 of trunk coupler 2052, restoring and operating, open and close the line loop across the tip and ring conductors of incoming trunk 2085-1 extending to incoming trunk coupler 2500-I. At the same time, ground potential is extended through back contacts 2 of relay 701 and through make contacts 2 of incoming hold relay 702 to the winding of series relay 706. Series relay 706 operates and at its contacts 1 and 2 shunt the inductive windings A and B of repeat coil 715 to improve dialing; at its contacts 3 shunt break contacts 1 of count relay 711; and at its make contacts 4 operates count relay 711.

The opening and closing of the line loop across the tip and ring conductors of incoming trunk 2085-1, extending to incoming coupler 2500-I, causes line relay 2503 to restore and reoperate accordingly. On each restoration of line relay 2503, ground potential through contacts 1 is extended through make contacts 3 of release relay 2505 to wire 2550 extending to sequence register SE. Make contacts 2 open and close the operate circuit of series relay 2504 causing it to restore and remain restored until the completion of the dialing of each digit. These pulses of ground on wire 2550 are extended through break contacts 1 of sequence register SE to battery potential through the winding of hundreds register HR. Hundreds register HR, as described in the noted Bellamy and Bowser application operates step by step according to the number of pulses in the first digit. At its make contacts, hundreds register HR prepares an operate circuit for sequence register SE responsive to the reoperation of series relay 2504 at the end of each digit.

On completion of the dialing of the first digit, series relay 2504 reoperates and at its contacts 5 place ground potential through the noted make contacts 1 of the hundreds register HR, through break contacts 5 of ring cut-off relay 2507 to battery potential through the winding of sequence register SE, advancing it to its next position.

On the dialing of the second digit of the directory number of the desired subscriber, restoration of line relay 2503 restores series relay 2504 removing the ground potential from the winding of sequence register SE. At its back contacts 1, line relay 2503 delivers ground potential pulses to wire 2550 extending to the tens register TR (not shown) through break contacts 2 and make contact 1 of sequence register SE. On completion of the dialing of each digit, register SE advances to its next position thereby causing the pulses of ground potential on wire 2550 to be extended to the register corresponding to the digit dialed.

When the dialing of the directory number of the desired subscriber S2 on line 1210 is completed, as described in the noted Bellamy and Bowser application, the tip, ring, and sleeve conductors of incoming block coupler 2500–I is extended through conductors in group 205–1, over a block-link such as block-link 1206 to a terminating trunk such as terminating trunk 1207 extending to line-link secondary switch 1900B. The common control apparatus thereafter extends the connection over a line-link such as line-link 1202B, through secondary switch 1900B and primary switch 1800B to line 1210, and through main frame jumper 1209 to the called station S2 on line 1210. The called station is now signalled in the normal manner and the calling station on calling line 200 of exchange A is extended to station S2 on the called line 1210 of exchange B.

When the called station S2 on line 1210 answers the call, back-bridge relay 2507 operates from the called line loop closure and at its contacts 1 and 2 reverses the tip and ring conductors extending to trunk coupler 2052. This reversed battery and ground potentials from incoming coupler 2500–I causes incoming supervisory relay 708 of trunk coupler 2052 to operate as relay 708 is a polarized relay. At its contacts 1, relay 708 extends ground potential to the winding of incoming supervisory auxiliary relay 707, operating it. At its contacts 2, relay 707 removes ground potential from wire 740 and replaces it with negative battery potential. This negative battery potential is extended over trunk line L1 and L2 to trunk coupler 2051 of exchange A to operate incoming line relay 600. Both upper windings of relays 600 and 700 are shunted by battery potential and the lower windings are connected across battery and ground potentials. The lower windings of both line relays are thereby energized, operating both relays. Contacts on incoming relay 600 operate repeat relay 601 which at its contacts 2 operate incoming hold relay 602. Contacts 2 of incoming hold relay 602 extend ground potential through make contacts 3 of outgoing hold relay 605 to the winding of outgoing supervisory relay 607, operating it. At its contacts 1 and 2, relay 607 reverses the battery and ground potentials on the tip and ring conductors of incoming coupler 1500–I furnishing reverse battery supervision.

The established connection is cleared out responsive to the opening of the line loop across the tip and ring conductors of incoming trunk 2085–1 by the replacing of the receiver of the calling subscriber. The concerned block couplers in exchanges A and B and the concerned trunk couplers are returned to normal use again, each supplying an idle-indicating battery potential to the sleeve conductor, indicating their idle condition.

IIA2. *Station S1 on line 200 calls the operator at toll board TB*

The local subscriber at exchange A (station S1 on line 200) to reach the operator at station B, dials the digit "0" and automatically is cut-through to the toll board. The operation of the system in handling the calls from a local subscriber in exchange A to an operator at exchange B will now be described with particular reference to Figs. 4 through 9.

As hereinbefore pointed out, the removal of the receiver at station S1 on line 200 associates the calling line with a block coupler such as block coupler 500–L over a line-link such as line-link 202A and an originating trunk such as originating trunk 203A. Dialing of an initial digit "0" causes the apparatus in exchange A to extend the calling line to an outgoing trunk such as 2020–0 through block-primary switch 1300 and block-secondary switch 1400 over a block-link such as block-link 206. The calling line is further extended over conductors in cable K–2020–8 through trunk jumpers 2021–0 to the tip, ring, and sleeve conductors of trunk coupler 2051. As hereinbefore pointed out, the common control equipment of exchange A will extend the calling line to outgoing trunk 2020–0 responsive to the dialing of the digit "0" only if the sleeve conductor of such an outgoing trunk is idle. This idle-indicating battery is supplied through current-limiting resistor 612 of trunk coupler 2051. The tip and ring conductors of outgoing cable K–2020–0 is extended to ground and battery potentials through the winding of outgoing line relay 604 through contacts 1 and 2, and 5 and 6 of incoming cut-through relay 603, through the A and B windings of repeat coil 615, and through back contacts 1 and 2 of outgoing supervisory relay 607. The ring conductor is also extended through the winding of high resistance outgoing toll discriminating relay 1602.

The high resistance winding of outgoing toll discriminating relay 1602 being in the series with the windings of outgoing line relay 604 limits the current flowing through the calling line loop to a value which prevents the operation of relay 604 but causes outgoing toll discriminating relay 1602 to operate.

Contacts 1 of outgoing toll discriminating relay 1602 operate outgoing toll discriminating auxiliary relay 1600 and contacts 2 of relay 1602 operate outgoing hold relay 605 through back contacts 7 of incoming cut-through relay 603. Contacts 2 of outgoing toll discriminating auxiliary relay 1600 extends positive battery potential through current-limiting resistor 1605 to wire 1641 extending to make contacts 6 of relay 605.

Operation of outgoing hold relay 605, causes ground potential to be extended through its make contacts 2 to operate series relay 606; causes its contacts 4 to extend ground potential to toll discriminating cut-off relay 1601, operating it; causes its contacts 5 to shunt the incoming toll discriminating relay 1603 and its associated rectifier 1604; and causes its contacts 6 to extend the noted positive battery potential to make contacts 2 of line relay 604 in preparation for seizing trunk coupler 2052 of exchange B.

Series relay 606, at its contacts 1 and 2, shunt the A and B windings of repeat coil 615 placing the tip and ring conductors of outgoing trunk 2020–0 directly across the windings of outgoing line relay 604.

Toll discriminating cut-off relay 1601 operates responsive to the closing of contacts 4 of outgoing hold relay 605. Its contacts 1 shunt the high resistance winding of outgoing toll discriminating relay 1602, causing it to restore. The closing of contacts 1, shunting the high resistance winding of relay 1602, permits the current flow through the windings of outgoing line relay 604 to reach an operating value thereby causing outgoing line relay 604 to operate.

Operation of outgoing line relay 604, causes contacts 1 to extend a locking ground potential on wire 1640 to hold outgoing hold relay 605 and toll discriminating cut-off relay 1601 operated. Series relay 606 releases responsive to the operation of outgoing line relay 604 as ground potential is removed from back contacts 1 of relay 604. The tip and ring conductors of the calling line is again extended through the A and B windings of the repeat coil 615.

Contacts 2 of outgoing line relay 604 extend the noted positive battery potential on wire 1641 to wire 640 extending to the windings of incoming line relay 600. This battery potential is extended through the upper winding of relay 600 over wire 1631, through make contacts 5 of outgoing hold relay 605, over wire 1630 and through the C and D windings of repeat coil 615 to trunk coupler 2052 in exchange B over trunk lines L1 and L2.

This positive battery potential is extended through the C and D windings of repeat coil 715 to wire 1730 extending to incoming toll discriminating relay 1702 and its associated rectifier 1704.

Rectifier 1704 is connected in shunt of incoming toll discriminating relay 1702 in such a manner that it offers negligible resistance to negative battery potential and infinite resistance to positive battery potential. Since the battery potential appearing on wire 1730 is positive, rectifier 1704 directs the current flow through the winding of incoming toll discriminating relay 1702, operating it. Relay 1702 locks operated through its make contacts 1 and at its contacts 3 prepare trunk coupler 2052 to furnish the proper battery polarity for answer supervision. Positive battery potential from current-limiting resistor 1605 is further extended over wire 1731, through the winding of incoming line relay 700 and over wire 740 to ground potential at contacts 2 of incoming supervisory auxiliary relay 707 through break contacts 2 of outgoing line relay 704.

As hereinbefore pointed out, line relays 600 and 700 of Figs. 6 and 7 have tandem-wound differentially-connected relay coils. Associated with each relay is a current-limiting resistor such as 614 and 714 and each are initially adjusted to match the impedance of the trunk line extending between the two exchanges. With this adjustment correctly made, the current flow through the upper and lower windings of relay 600 is equal and opposite and relay 600 does not operate. However, ground potential on wire 740 shunts the lower winding of relay 700 thereby permitting the winding to be effective, causing relay 700 to operate.

As previously described, operation of incoming line relay 700 causes relays 702 and 703 to operate. Contacts on these relays bridge the tip and ring conductors of incoming trunk 2085-1 and extend this closed line loop over incoming trunk 2085-1 of cable K-2085-1 to incoming coupler 2500-I. This loop is extended through the windings of line relay 2503 and through the windings of differential relay 2518 to battery and ground potentials. Current flow over the line loop causes the line relay 2503 of incoming coupler 2500-I to operate. Since relay 2528 is a differentially-connected relay and equal amounts of current flow through each winding, relay 2528 does not operate.

Make contacts 2 of line relay 2503 extend ground potential to the winding of series relay 2504 operating it and at its make contacts 1, extent ground potential to the winding of release relay 2505, operating it. Release relay 2505, at its make contacts 2, place ground potential on wire 2519 extending to make contacts 1 of toll relay 2529.

Referring again to trunk coupler 2052 of Fig. 7, incoming cut-through relay 703 at its contacts 4 remove the idle-indicating battery from the sleeve connection extending to outgoing trunk 2020-3 and at its contacts 3 place a ground potential on the sleeve conductor of incoming trunk 2085-1 to render this trunk coupler busy to outgoing calls.

In its normal condition, condenser 717 is fully charged from battery and ground potential through current-limiting resistor 716. Operation of incoming hold relay 702 causes its contacts 4 to extend the full charge on condenser 717 through back contacts 9 of outgoing hold relay 705 and through make contacts 2 of operated incoming toll discriminating relay 1702 to battery potential through the winding of toll control relay 710.

Relay 710 operates from the current flowing from the discharging condenser 717. When the condenser is fully discharged, relay 710 restores. Make contacts on toll control relay 710 place ground potential through break contacts 4 of series relay 706 to the ring conductor of the incoming trunk 2085-1 extending to incoming trunk coupler 2500-I over cable K-2085-1. This ground potential is placed on the ring conductor only momentarily as relay 710 remains operated only for the time duration of the discharge of condenser 717.

This momentary pulse of ground potential is extended over the ring conductor of incoming trunk 2085-1 to incoming coupler 2500-I shunting the upper winding of differential relay 2528 and line relay 2503 thereby causing the current flow through the lower winding of the differential relay to be effective, operating relay 2528. Ground potential from contacts of differential relay 2528 is extended to the winding of toll relay 2529.

Toll relay 2529 operates and locks to ground potential on wire 1519 through its make contacts 1 and at its make contacts 2 extends ground potential from wire 2520 (as described and illustrated in the noted former application, the corresponding wire is at ground potential) to wire ID-10 extending to the outgoing controller 1700 of Fig. 6 of the noted Bellamy and Bowser application. This ground potential on initial digit wire ID-10 causes the common apparatus of exchange B to extend the connection through a primary and secondary switch on the block-link frame to an outgoing trunk such as an outgoing trunk 9020-0 extending to trunk coupler 9001.

As hereinbefore pointed out, trunk coupler 9001 is similar to the trunk coupler of the noted Pier Bakker application and the seizure of this trunk coupler by the switch-through operations of block coupler 2500-I causes the toll operator to be signalled in the normal manner.

When the toll operator answers the call, the line loop across the tip and ring conductors extending to the toll board is closed, thereby operating back-bridge relay 2502 which at its contacts 1 and 2 reverse the tip and ring conductors of incoming trunk 2085-1. This battery reversal on the tip and ring conductors causes incoming supervisory relay 708, a polarized relay, to operate and extend ground potential to the winding of relay 707, operating it. Incoming supervisory auxiliary relay 707 at its contacts 1 shunt the lower winding of incoming toll discriminating relay 1702 which remains operated through energization of its upper winding and at its contacts 2 remove ground potential from wire 740 and replace it with positive battery potential through current-limiting resistor 713. This positive battery potential is thereby transmitted over trunk line L1 and L2 extending to exchange A and through the winding of incoming line relay 604 to positive battery from current-limiting resistor 1605. As previously pointed out, battery potential of the same polarity on both sides of the upper windings of the line relays shunt the upper windings and energizes the lower windings. Therefore, relays 600 and 700 are operated from the current flow through their lower windings.

Relay 600, at its contacts, extends ground potential to the winding of incoming repeat relay 601 of trunk coupler 2051, operating it. Contacts on relay 601 extend ground potential to the winding of incoming hold relay 602, operating it. Make contacts 2 of incoming hold relay 602 extend ground potential to the winding of outgoing supervisory relay 607, operating it. Contacts 1 and 2 of outgoing supervisory relay 607 provide the calling station S1 on line 200 with answered supervision. The calling party S1 on line 200 of exchange A may converse with the toll operator at exchange B.

On completion of the conversation between the calling subscriber in exchange A and the operator the connection will be broken and the equipment used will be returned to common use in preparation for another call.

IIB. *Calls from exchange B to exchange A*

A detailed description of the operation of the system in extending a talking connection from a local subscriber in exchange B to another local subscriber in exchange A or in extending a talking connection from the operator at exchange B to a local subscriber in exchange A will now be given with particular reference to Figs. 4 through 9.

IIB1. *Station S1 on line 1200 calls station S2 on line 210*

The subscriber at station S1 on line 1200 in exchange B, to call the subscriber at station S2 on line 210 in exchange A, removes the receiver, waits for the dial tone from a local block coupler such as block coupler 1500–L, and then dials the trunk digit indexing exchange A, followed by the directory number of station S2 on line 210.

As hereinbefore noted, the removal of the receiver at a calling station S1 causes the calling line to be associated with an idle local block coupler through the operation of line controller switches and the line controller on the line-link frame containing the calling line. Station S1 is connected to a local block coupler such as coupler 1500–L through main frame jumper 1201, through contacts sets on line-link primary switch 1900A, over a line-link such as line-link 1202A, through contacts sets on line-link secondary switch 1900A, and over an originating trunk such as originating trunk 1203A and its associated jumper 1204.

As hereinbefore noted, the dialing of an initial digit "3" by a subscriber in exchange B causes the concerned block coupler to seize an outgoing trunk extending to exchange A. Therefore, the common apparatus of the switchboard at exchange B (shown in part in Fig. 3) extend the connection from block coupler 1500–L over the tip, ring, and sleeve conductors of group 1205, through contact sets on block-link primary switch 1300A, over a block-link such as block-link 1206, and through contact sets on block-link secondary switch 1300A to outgoing trunk 9020–3 and jumper 9021–3. The connection is thereby extended from the calling subscriber to trunk coupler 2052 over outgoing trunk 9020–3.

In order for the calling line to seize trunk coupler 2052, the common apparatus in the outgoing controller (not shown) tests the sleeve conductor of outgoing trunk 9020–3 and if it finds idle-indicating battery from idle-indicating resistor 712 (Fig. 7) causes block coupler 1500–L to switch-through and seize trunk coupler 2052.

The line loop being closed across battery and ground potential through the windings of outgoing line relay 704 through break contacts 1 and 2 of outgoing supervisory relay 709, through back contacts 1 and 2, and 5 and 6 of incoming cut-through relay 703, and through the A and B windings of repeat coil 715, operates relays 704.

Contacts 1 of outgoing line relay 704 extend ground potential through back contacts 7 of incoming cut-through relay 703 and back contacts 4 of outgoing hold relay 705 to the winding of outgoing toll discriminating relay 1701. Relay 1701 operates and at its contacts 2 extend its operating ground potential to the winding of outgoing hold relay 705, operating it. Contacts 2 of relay 704 prepare a seizure circuit for seizing trunk coupler 2051 in exchange A.

Operation of outgoing hold relay 705 transfers the sleeve conductor of outgoing trunk 9020–3 from idle-indicating battery potential to ground potential through the lower winding of outgoing sleeve detector relay 1700 thereby guarding the concerned coupler against seizure. Contacts 5 prepare an operate circuit for series relay 706; make contacts 4 close a locking circuit for relays 705 and 1701; make contacts 2 extend ground potential to wire 1732; contacts 7 place a shunt around the winding of incoming toll discriminating relay 1702 and around its associated rectifier 1704; contacts 8 extend negative battery potential from current-limiting resistor 713 through make contacts 4 of operated outgoing toll discriminating relay 1701, make contacts 2 of outgoing line relay 704, over wire 740 through the upper winding of incoming line relay 700, over wire 1713, contacts 7 of relay 705, wire 1730, and through the C and D windings of repeat coil 715 to exchange A over trunk wires L1 and L2; and break contacts 9 open the operate circuit of toll control relay 710.

Negative battery potential from current-limiting resistor 713 reaches exchange A over trunk wires L1 and L2 and is extended through the C and D windings of repeat coil 615 to wire 1630 extending to the winding of incoming toll discriminating relay 1630 and its associated resistor 1604. The polarity of rectifier 1604 is such that it offers negligible resistance to the flow of current from the negative battery potential. This negative battery potential is extended through rectifier 1604, through the winding of incoming line relay 600, over wire 1631, through back contacts 2 of outgoing line relay 604 and through back contacts 2 of incoming supervisory auxiliary relay 609 to ground potential. Current flow over this noted path causes incoming line relay 600 to operate.

When trunk coupler 2051 is seized by trunk coupler 2052 with negative battery potential over the L1 and L2 conductors, incoming line relay 700 remains in an unoperated condition due to the equal amounts of current flowing through each of its windings, but incoming line relay 600 operates as its lower winding is shunted by ground potential through variable resistor 614 and ground potential through back contacts 2 of incoming supervisory auxiliary relay 609.

Operation of incoming line relay 600 causes its contacts to place ground potential to the winding of incoming repeat relay 601, operating it. Contacts 2 of relay 601 extend ground potential to the winding of incoming hold relay 602, operating it. Contacts 2 of incoming hold relay 602 extend ground potential through back contacts 3 of outgoing hold relay 605 to the winding of incoming cut-through relay 603 and prepare an operating circuit for series relay 606.

Relay 603 operates and at its contacts 4 remove the idle-indicating battery from the sleeve conductor of outgoing trunk 2020-0; contacts 1 and 2, and contacts 5 and 6 of relay 603, together with make contacts 1 of incoming repeat relay 601 place the windings of incoming supervisory relay 610 (polar relay) in series with current-limiting resistor 618 across the tip and ring conductors of incoming trunk 2085, extending to incoming coupler 1500-I over the conductors in cable K-2085; contacts 3 and 4 extend battery potential through resistor 612 to the sleeve conductor extending to incoming coupler 1500-I; and contacts 7 open the operate circuit of outgoing hold relay 605.

As previously pointed out, incoming coupler 1500-I is similar to incoming coupler 500-I of the noted Bellamy and Bowser application. The initial digit register IDR, and the reverting call relay have been omitted while discriminating relay 1526 has been added. The numbering of the relays is similar to the numbering in the noted application except the numeral two is prefixed to the relay numbers.

With the operation of incoming repeat relay 601 and incoming cut-through relay 603 of trunk coupler 2051, the winding of the incoming supervisory relay 610 is placed in series with resistor 618 across the tip and ring conductors of incoming trunk 2085 extending to incoming coupler 1500-I. This closed loop across the tip and ring conductors is extended through back contacts 1 and 2 of switch-through relay (not shown) and through back contacts 1 and 2 of back-bridge relay 1502 to battery and ground potentials through the windings of line relay 1503. Current flowing through this closed line loop causes line relay 1503 to operate.

Contacts 1 of line relay 1503, as described in the noted Bellamy and Bowser application, extends ground potential to the winding of release relay 1505, operating it. Make contacts 1 of release relay 1505 extend battery potential from current-limiting resistor 612 of trunk coupler 2051 through break contacts 2 of time pick-up relay 1513 to the upper winding of discriminating relay 1516. Discriminating relay 1526, however, does not operate at this time as it is shunted by ground potential from break contacts 1 of units register UR.

Make contacts 2 of line relay 1503 extend ground potential to the winding of series relay 1504, operating it. Contacts 5 of series relay 1504 prepare an operate path for sequence counter SE, following the dialing of the first digit.

After seizure of incoming coupler 1500-I by trunk coupler 2051 from the calling subscriber S1 on line 1200, the hundreds, tens, units and station digits of the desired subscriber S2 on line 210 is dialed. As the line loop is opened and closed by the calling subscriber dial contacts, outgoing line relay 704 of trunk coupler 2052 follows these pulses and at its contacts 1 extend battery and ground potential pulses to wire 740 extending to incoming line relay 700. These pulses of battery and ground potential are transmitted over trunk lines L1 and L2 to ground potential at back contacts 2 of incoming supervisory auxiliary relay 609.

Incoming line relay 600 restores and reoperates according to the pulses of battery and ground potential and extends corresponding pulses of ground to the winding of incoming repeat relay 601 causing it to restore and reoperate. The restoration and reoperation of relay 601 causes its make contacts 1 to open and close the line loop across the tip and ring conductors extending to incoming coupler 1500-I. Line relay 1503 follows this opening and closing of the line loop and at its make contacts 1, extend pulses of ground potential through back contacts 1 of relay 1503, through make contacts 3 of release relay 1505, and through break contacts 1 of sequence counter SE over wire 1550 to the winding of hundreds register HR, causing it to advance to a position corresponding to the value of the digit dialed. During the dialing of each digit, pulses of ground potential are extended through make contacts 1 of relay 1503 to the winding of release relay 1505 holding it operated.

As described in the noted Bellamy and Bowser application, during the dialing of the first digit, series relay 1504 restores and on completion of the dialing of the first digit, reoperates and remains operated until the next digit is dialed. Ground potential from make contacts 5 of series relay 1504 is extended through make contacts 1 of hundreds register HR and through back contacts 5 of ring cut-off relay 1507 to the winding of sequence counter SE, causing it to advance one step.

Counter SE operates on completion of the dialing of the first digit and transfers wire 1550 from the winding of hundreds register HR to the winding of tens register TR. Subsequent digits dialed cause sequence counter SE to advance on the completion of the dialing of each digit and transfer the pulsing wire 1550 to the corresponding register.

Referring now to trunk coupler 2052 of Figs. 7 and 8, it will be noted that, following its seizure, relays 704, 705, and 1701 are operated. As described in the noted Bellamy and Bowser application, seizure of trunk coupler 2052 or any outgoing trunk from any block coupler is accomplished by switching-through operations. For the slow-release time of the release relays such as relay 2505, ground potential remains on the sleeve conductor of the coupler extending to the concerned outgoing trunk. This ground potential is therefore shunting the lower winding of relay 1700 for a duration of time possibly greater than the inter-digit time interval. In order that the trunk coupler may discriminate between a toll and a local call by detecting the presence of ground potential on the sleeve conductor, the discrimination must be delayed until the noted switch-through ground potential disappears.

As previously pointed out, if the call to a local subscriber in exchange A was originated by a toll operator at the toll board, a toll coupler such as incoming coupler 3500–I projects ground potential ahead on the sleeve conductor. If the call were originated by a local subscriber, the holding ground for the concerned primary and secondary switches would be supplied from the concerned trunk coupler. Trunk coupler 2052 must, therefore, be arranged to delay the discrimination operations until the start of the second digit of the directory number. The operation of trunk coupler 2052 in discriminating between a local and a toll call will now be described.

Referring now to Figs. 7 and 8, it will be observed that outgoing toll discriminating relay 1701 is locked operated over two paths. One locking path is from battery potential through the lower winding of relay 1701, through its make contacts 2 or 3 to ground potential through make contacts 1 of outgoing line relay 704. The other locking path is from battery potential through the upper winding of relay 1701, through its make contacts 1 to ground potential on wire 1732 through break contacts 1 of count relay 711.

During the dialing of the first digit of the directory number of station S2 on line 210 of exchange A, outgoing line relay 704 restores and reoperates according to the digit dialed. On each restoration of relay 704, the locking path for the lower winding of relay 1701 is opened. However, series relay 706 operates and remains operated during the dialing of each digit and at its contacts 5 extends ground potential from wire 1732 to the upper winding of relay 1701 maintaining it operated. At its contacts 6, relay 706 extends ground potential to the winding of count relay 711; and at its contacts 1 and 2, shunt the A and B windings of repeat coil 715 to improve dialing.

Count relay 711 operates and locks through its contacts 2 to ground potential on wire 1732. At it scontacts 1, relay 711 opens the locking circuit of the upper winding of relay 1701.

When the line relay 704 reoperates, upon completion of the dialing of the first digit, its make contacts 1 close the locking circuit for the lower winding of relay 1701 and at its break contacts 1, restore series relay 706.

After completion of the dialing of the first digit of the directory number, the sleeve conductor S of outgoing trunk 9020–3 has battery potential on it, if the call is from a local subscriber, or has ground potential on it, if the call is from an operator.

Since the call was originated by a local subscriber, current flow from ground potential through the lower winding of relay 1700 to the noted battery potential on the sleeve conductor of trunk 9020–3, operates relay 1700. Relay 1700 locks operated to ground potential on locking wire 1732 and at its contacts 1 shunt contacts 1 of count relay 711 and contacts 3 of series relay 706.

Relay 1701 remains locked operated throughout the duration of the call and at its contacts 4, maintain negative battery potential on wire 740 extending to exchange A.

Therefore, on a call from a local subscriber in exchange B to a local subscriber in exchange A, trunk coupler 2051 is seized by negative battery potential over wires L1 and L2 and the digits are dialed with pulses of this negative battery potential.

Referring now to Fig. 4, operation of units register UR removes the shunting ground potential from the winding of discriminating relay 1526 permitting it to operate from battery potential through current-limiting resistor 612 of trunk coupler 2051. Discriminating relay 1526 locks operated through its lower winding and make contacts 2, to ground potential on wire 1519. Contacts 1 of relay 1526 complete the operate path of time pick-up relay 1513 thereby permitting permanent timing and conversation timing to take place in coupler 1500–I.

On completion of the dialing of the directory number of the called subscriber S2 on line 210, the common equipment at exchange A operates, as described and disclosed in the noted Bellamy and Bowser application, to signal the called station S2.

When the called party answers, the closing of the called line operates back-bridge relay 1502, which at its contacts 1 and 2, reverse the battery and ground potential across the tip and ring conductors extending from trunk coupler 2051. This battery reversal causes incoming supervisory relay 610 to operate. At its contacts 2, relay 610 extends ground potential from make contacts 2 of incoming hold relay 602 and through back contacts 2 of outgoing hold relay 605 to the winding of incoming supervisory auxiliary relay 609, operating it.

At its make contacts 1, relay 609 places a shunt across incoming toll discriminating relay 1603 and its associated rectifier 1604, and at its make contacts 2, removes ground potential from wire 640 and replaces it with negative battery potential through current-limiting resistor 613. This battery potential is extended over trunk wires L1 and L2 to the winding of incoming relay 700, thereby operating it as the upper windings of both incoming line relay 600 and 700 are shunted by battery potential from current-limiting resistor 613 in trunk coupler 2051 and current-limiting resistor 713 in trunk coupler 2052.

Contacts on incoming line relay 700 extend ground potential to the winding of incoming repeat relay 701, operating it. Contacts 2 of incoming repeat relay 701 extend ground potential to the winding of incoming hold relay 702, operating it. Make contacts 3 of incoming hold relay 702 extend ground potential through make contact 6 of outgoing hold relay 705 to the winding of outgoing supervisory relay 709, operating it. Contacts 1 and 2 of outgoing supervisory relay 709, reverse the battery and ground potentials across the tip and ring conductors of outgoing trunk 9020–3, extending to the calling line.

The calling subscriber S1 on calling line 1200 may now converse with the called station S2 on called line 210.

On completion of the conversation, disconnect by the calling party, permits the apparatus used in the talking connection to restore to normal in preparation for another call.

IIB2. *Toll board TB calls station S2 on line 210*

Referring now to Fig. 3 of the drawings it will be observed that the operator at the toll board may seize an incoming toll coupler 3500–I over an incoming trunk 2085–3 and its associated trunk coupler 9053, and that exchange C may reach an incoming toll coupler such as toll coupler 3500–I over an incoming trunk such as incoming trunk 2085-2 and its associated trunk coupler 2054.

As hereinbefore pointed out, trunk coupler 2054 and 9053 are one way trunk couplers similar to the trunk repeater of the noted Pier Bakker patent. Coupler 9053 is connected to the toll board through jumper 2084-3 and connected to incoming trunk 2085-3 over jumpers 2084′-3. Trunk coupler 2054 is connected to line 2055 extending to exchange C through jumper 2084-2 and is connected to incoming trunk 2085-2 over a jumper such as jumper 2084′-2.

Block couplers 3500-I are incoming toll couplers similar to the incoming couplers of the noted Bellamy and Bowser application. However, these couplers are arranged to extend an identifying ground forward on the sleeve conductor to identify a call as one from a toll operator. The timing relays and the revertive call relay are omitted, as they are unnecessary in this coupler.

The dialing of the directory number of a local subscriber in exchange A causes block coupler 3500-I to seize the common equipment and to extend the call over conductors in group 1205-2 or 1205-3. The block primary switch 1300A is closed and an idle block-link such as block-link 206 is seized. Assuming the initial digit dialed is the digit "3," block secondary switch 1400A causes the connection from coupler 3500-I to be extended to trunk coupler 2052 over outgoing trunk 9020-3.

Referring now to Fig. 9, part 2, outgoing trunk 9020-3 is shown extending to trunk coupler 2052 over conductors in cable K-9020-3.

With the connection from toll coupler 3500-I being extended to the trunk coupler 2052, the tip and ring conductors are bridged in the normal manner and ground potential is projected ahead on the sleeve conductor. The bridged line loop is extended through trunk coupler jumpers 9021-3, to battery and ground potentials through the windings of outgoing line relay 704. Current flow through the windings of outgoing line relay 704 and over the line loop extending to coupler 3500-I, causes outgoing line relay 704 to operate.

As hereinbefore pointed out, seizure of trunk coupler 3052 operates relays 704, 705, and 1701 and seizes trunk coupler 2051 with negative battery potential from current-limiting resistor 713.

With the dialing of the directory number of the desired subscriber at station S2 on line 210 of exchange A, outgoing line relay 704 restores and reoperates according to the dial pulses constituting the digits of the directory number. Hold relay 705 remains operated due to its slow-release characteristics and series relay 706 operates and remains operated during the dialing of each digit.

Count relay 711 operates on the start of the first digit and locks operated through its make contacts 2. Its make contacts 1 open the initial locking circuit of relay 1701.

On completion of the dialing of the first digit, the locking ground potential for the upper winding of outgoing toll discriminating relay 1701 is open at make contacts 5 of series relay 706 and at break contacts 1 of count relay 711.

During the dialing of the first digit, ground potential from block coupler 3500-I remains on the sleeve conductor of outgoing trunk 9020-3 as the call is from an operator and outgoing sleeve detector relay 1700 fails to operate as it is shunted by the ground potential from the sleeve conductor.

On the start of the dialing of the second digit of the directory number of the called station in exchange A, outgoing line relay 704 restores and removes ground potential from the winding of outgoing hold relay 705. This removal of ground potential from the winding of outgoing hold relay 705 does not restore it for reasons hereinbefore pointed out, but it removes ground potential from make contacts 3 of outgoing toll discriminating relay 1701, which is fast acting and releases immediately. The operate path of outgoing toll discriminating relay 1701 is opened at back contacts 4 of outgoing hold relay 705 preventing its reoperation at the end of the first pulse of the second digit of the directory number.

At the time outgoing line relay 704 restored on the start of the first pulse of the second digit, its break contacts 2 extend ground potential on wire 740 to exchange A. At this point, incoming line relay 600 of trunk coupler 2051 is in a restored condition. At the same time, outgoing toll discriminating relay 1701 restores and transfers the armature 4 of incoming toll discriminating relay 1701 from negative battery potential through current-limiting resistor 713 to positive battery potential through current-limiting resistor 1705. This reversal of battery polarity extending to exchange A takes place at a time when incoming line relay 600 is in a restored condition, thereby not adding an additional or false pulse to the second digit of the directory number.

Outgoing toll discriminating relay 1701, once restored, remains in an unoperated condition during the dialing of the remaining digits of the directory number. Therefore, trunk coupler 2051 of exchange B is seized with negative battery potential and the first digit of the directory number is dialed with negative battery polarity pulses. The remaining digits of the directory number are dialed with pulses of positive battery polarity. These battery pulses of positive polarity are extended through the C and D windings of repeat coil 615, over conductor 1630 to the winding of incoming toll discriminating relay 1603 and to one side of its associated rectifier 1604. As previously pointed out, rectifier 1604 is so connected that it offers negligible resistance to a negative battery polarity but infinite resistance to positive battery polarity. Therefore, the current passes through the winding of incoming toll discriminating relay 1603, over conductor 1631, through the winding of incoming line relay 600, over conductor 640, back contacts 2 of outgoing line relay 604 and through break contacts 2 of incoming supervisory auxiliary relay 609. This current flowing through the winding of incoming toll discriminating relay 1603 operates it.

Operation of incoming toll discriminating relay 1603 causes its contacts to place ground potential to the winding of toll control relay 608. Toll control relay 608 operates and locks through its make contacts 2 to ground potential through make contacts 2 of incoming hold relay 602. Make contacts 3 of relay 608 transfer the answered supervision battery polarity from negative battery potential to positive battery potential.

As pointed out, incoming line relay 600 operates and at its make contacts, operates relay 601. Relay 601 thereafter operates incoming hold relay 602 and incoming cut-through relay 603.

Incoming line relay 600 of trunk coupler 2051 responds to the dial pulses by operating incoming repeat relay 610. Accordingly, at its contacts 1, incoming repeat relay 601 opens and closes the line loop extending to incoming coupler 1500–I over conductors in cable K–2085. The digits of the directory number of subscriber S2 on called line 210 of exchange A are registered on the corresponding digit registers.

Since the call originated from a toll coupler, ground potential was projected ahead to trunk coupler 2052, identifying the call as one from a toll board. Incoming toll discriminating relay 1603 of trunk coupler 2051 operated and operated the toll control relay 608. At its make contacts 1, toll control relay 608 places ground potential through make contacts 3 of incoming cut-through relay 603 to the sleeve conductor of incoming trunk 2085 extending to incoming coupler 1500–I. The tip and ring conductors are bridged in the usual manner across the windings of incoming supervisory relay 610 and is extended to battery and ground potentials through the windings of line relay 1503, through back contacts 1 and 2 of back-bridge relay 1502. The sleeve conductor is extended through make contact 1 of release relay 1505, which operated responsive to the operation of line relay 1503, and through break contacts 2 of time pick-up relay 1513 to ground potential through the winding of discriminating relay 1526. This ground potential on the sleeve conductor shunts the upper winding of discriminating relay 1526 preventing its operation. The opening and closing of the line loop across the tip and ring conductors of incoming trunk 2085, restore and reoperate line relay 1503. As previously pointed out, the sequence register SE distributes the digits of the directory number to the corresponding digit registers.

On the dialing of the units digits of the directory number of the called subscriber, units register UR operates and at its break contacts 1, remove one of the shunting ground potentials from the upper winding of discriminating relay 1526. However, since the call is a toll call, trunk coupler 2051, at make contacts 1 of toll control relay 608, extends ground potential to the sleeve conductor thereby maintaining discriminating relay 1526 unoperated.

On completion of the dialing of the last digit of the directory number, station register SR operates to record the stations digit. At its break contacts 1, register SR opens the operate circuit of time pick-up relay 1513. The operate circuit of relay 1513 remains open, due to the fact that discriminating relay 1526 does not operate. Under these conditions, timing is discontinued and the toll operator is not limited by either conversation or permanent timing. If the call had been from a subscriber, as pointed out hereinbefore, discriminating relay 1526 would have operated and at its make contacts 1 would have completed the operate path of time pick-up relay 1513 and the connection would be under control of both permanent and conversation timing.

The block coupler, upon receiving the dialed digits of the directory number of the called subscriber, causes the common apparatus to extend the connection to the called line over conductors in group 205–1, through an associated contact set on primary switch 1300, over a block-link such as block-link 206, through contact sets of secondary switch 1400, and over terminating trunk 207B to the line-link frame containing the called line. The connection is thence extended through secondary switch 900B and primary switch 800B over an idle line-link, such as line-link 202B to called station S2 on called line 210. The block coupler thereafter signals the called subscriber in the normal way.

Answer by the called subscriber S2 on line 210 closes the bridge across the tip and ring conductors of group 205–1, thereby operating back-bridge relay 1502. Make contacts 1 and 2 of relay 1502 reverse the tip and ring conductors extending to trunk coupler 2051. This reversal causes current to flow in the opposite direction through the winding of incoming supervisory relay 610, operating it. Relay 610, at its contacts 2, extend ground potential to the winding of incoming supervisory auxiliary relay 609, operating it. At its contacts 2, relay 609 extends positive battery polarity from current-limiting resistor 1605 through make contacts 3 of toll control relay 608 to wire 640 extending to exchange B.

Positive battery potential from resistor 1605 being on one side of line relay 600 and positive battery potential from resistor 1705 being on one side of line relay 700, the upper windings of these relays are shunted. Therefore, each relay operates from the current flow through its lower winding.

The operation of line relay 700, responsive to the operation of relay 609, operates incoming repeat relay 701. Relay 701 operates relay 702. Relay 702, at its contacts 3 extend ground potential through make contacts 6 of operated hold relay 705 to the winding of outgoing supervisory relay 709. Relay 709 operates, and at its contacts 1 and 2, reverse the tip and ring conductors of outgoing trunk 9020–3, furnishing calling party answered supervision.

The calling operator may now converse with the called subscriber. The conversation timing of incoming coupler 1500–I has been disabled and the connection is under control of the operator.

On completion of the conversation, disconnect by the operator and the called party, permits all operated apparatus to restore in preparation for another call.

On all calls from exchange B to exchange A, whether toll or local, the trunk coupler in exchange A is seized with negative battery potential over trunk wires L1 and L2. The first digit (other than the initial digit indexing the desired exchange) of the directory number of the desired subscriber is dialed with pulses of negative battery potential. If the call is from a subscriber, the second digit and remaining digits are dialed with pulses of negative battery potential. Accordingly, the answered supervision is necessarily negative battery potential. If the call is from a toll operator, the second digit and remaining digits are dialed with pulses of positive battery and the answered supervision, in this case, is necessarily positive battery polarity.

IIC. *Toll board TB calls exchange B*

If the operator at toll board TB desires to call the subscriber at station S2 on line 1210 of exchange B, an incoming trunk coupler, such as trunk coupler 9053 and an incoming block coupler, such as block coupler 3500–I are seized. The connection is extended over a block-link, such as block-link 1206, over conductors in group 1205–3 and associated contact sets on primary switch 1300A. The connection is thence extended through contact sets on secondary switch 1400A, over a terminating trunk 1207B, to line-link frame B, whereupon it is extended through contact sets on secondary switch 1900B, over a line-link such as line-link 1202B, and through contact sets on primary switch 1800B to station S2 on line 1210.

IID. *Toll call from exchange C to exchange A or exchange B*

If a toll call from exchange C is to be directed to a subscriber in exchange A or exchange B, a trunk coupler, such as trunk coupler 2054, is seized through main frame jumper 2056 and its associated trunk coupler jumpers 2084'-2 and 2084-2. The connection is further extended over an incoming trunk, such as incoming trunk 2085-2, to an incoming toll coupler, such as toll coupler 3500-I. The calling operator at exchange C dials the directory number of the desired subscriber in exchange A or exchange B and the call is extended over conductors in group 1205-2 through associated contact sets of primary switch 1300A. The call is thence extended over a block-link, such as block-link 1206, and through contact sets on secondary switch 1400A to an outgoing trunk. If the call is to exchange A the connection is extended to outgoing trunk 9020-3. If the call is to a subscriber in exchange B, the connection is extended to a terminating trunk, such as terminating trunk 1207B. The operation in extending the call from the concerned outgoing trunk or terminating trunk to the desired subscriber is as described for the toll operator at exchange B in extending a call.

III. THE SECOND EMBODIMENT

The second embodiment of the invention will now be described with particular reference to Figs. 10 and 11.

Figs. 10 and 11 replace Fig. 5 and Fig. 8, respectively. It will be noted that condenser 2614 of Fig. 10 and condenser 2714 of Fig. 11 are maintained in a charged condition through respective current-limiting resistors 2613 and 2713.

As hereinbefore pointed out, the second embodiment covers an arrangement for discriminating between toll and local calls between exchanges A and B by utilizing modulated tone sending and receiving equipment. The seizing, dialing and supervision between the two exchanges will be controlled over the signal leg of the simplex or composite trunk lines using negative battery potential for battery pulsing. The modulated tone will be placed on the tip and ring conductors of the trunk between the two exchanges if the call is from a toll operator to a subscriber in exchange A, or if the call is from a local subscriber in exchange A to the toll operator at toll board TB.

The operation of the system using modulated tone for discriminating purposes will now be described.

IIIA. *Calls from exchange A to exchange B*

A subscriber in exchange A on calling another subscriber in exchange B will seize the equipment at exchange B with negative battery potential over the signal leg. If the subscriber at exchange A desires the operator at toll board TB, the equipment at exchange B will be seized with negative battery potential over the signal leg and modulated tone will be placed on the tip and ring conductors, identifying the call as one to the toll operator.

IIIA1. *Station S1 on line 200 calls station S2 on line 1210*

The subscriber at station S1 on line 200 to call the subscriber at station S2 on line 1210, removes his receiver and dials the directory number of the desired subscriber. This directory number includes an initial digit "8" assigned specifically to lines of exchange B.

As previously described, removal of the receiver at calling station S1 causes the common apparatus of exchange A to extend the calling line to idle block coupler such as block coupler 500-L.

Dialing of the initial digit "8" causes the calling line to be extended through block coupler 500-L, to trunk coupler 2051 on trunk coupler frame 2052 over an outgoing trunk 2020-8. The directory number of the desired subscriber is hereafter dialed and the trunk coupler 2051 repeats the pulses of the digits over the trunk line to the apparatus in exchange B. The items of common apparatus are restored to common use and the calling line is now bridged across the tip and ring conductors of trunk coupler 2051.

The calling line loop, closed across the tip and ring conductors of outgoing trunk 2020-8, is extended through back contacts 1 and 2 of outgoing supervisory relay 607 and through break contacts on incoming cut-through relay 603 to battery and ground potential through the winding of outgoing line relay 604, operating it. As hereinbefore noted, operation of outgoing line relay 604 operates outgoing hold relay 605, which at its contacts 6 extend negative battery potential from current-limiting resistor 613 through break contacts 3 of toll control relay 608 and through make contacts 2 of outgoing line relay 604 to wire 640 extending to exchange B over trunk wires L1 and L2 through the upper winding of incoming line relay 600. This negative battery potential is further extended through the winding of incoming line relay 700 to ground potential at back contacts 2 of incoming supervisory auxiliary relay 707 of trunk coupler 2052.

As hereinbefore pointed out, operation of incoming line relay 700 when seized by negative battery potential from trunk coupler 2051, operates incoming repeat relay 701 which operates incoming hold relay 702. Incoming hold relay 702 operates incoming cut-through relay 703 which at its contacts 1 and 2 and 5 and 6 bridge the winding of incoming supervisory relay 708 in series with current-limiting resistor 718 and the A and B windings of repeat coil 715 across the tip and ring conductors of incoming trunk 2085-1 extending to incoming coupler 2500-I over conductors in cable K-2085-1.

The bridge across the windings of incoming supervisory relay 708 is extended through back contacts 1 and 2 of back-bridge relay 2502 to battery and ground potential through the winding of differential relay 2528 and line relay 2503. As noted before line relay 2503 operates from the current flow through the two windings while differential relay 2528 remains unoperated as the current flows through the two windings is equal and opposite. Operation of line relay 2503 operates relay 2505 and prepares the operate circuit for the digit registers to record the dialed digits of the directory number of the desired subscriber at station S2 on line 1210.

The remaining digits of the directory number of the desired subscriber are dialed causing the line loop across the winding of outgoing line relay 604 of trunk coupler 2051 to be opened and closed by the dial contacts. The digits dialed restore and reoperate line relay 604 which at its contacts 2, place pulses of battery and ground potentials on wire 640 extending to trunk coupler 2052 in exchange B. These pulses of battery potential and ground potential cause incoming line relay 700 to restore and reoperate accordingly. At its contacts, relay 700 repeats these pulses and restores and reoperates incoming repeat relay 701. Incoming repeat relay 701 at its make contacts 1, open and close the line loop across the windings of line relay 2503 and differential relay 2528. Line relay 2503 restores and reoperates according to the opening and closing of the line loop and at its contacts 1 register the dialed digits on the corresponding digit registers of incoming coupler 2500–I. Series relay 606 of trunk coupler 2051 and series relay 706 of trunk coupler 2052 operate as previously described to improve dialing.

On completion of the dialing of the directory number of the desired station S2 on line 1210, the common equipment of exchange B causes the connection to be extended to the desired subscriber and block coupler 2500–I signals the desired party in the usual manner.

When the called subscriber answers, the line loop extending to the called line is closed and current flow thereover through the winding of back-bridge relay 2502 to battery and ground potentials, operates relay 2502. At its contacts 1 and 2 back-bridge relay 2502 reverses the tip and ring conductors of incoming trunk 2085–1 which reverses the current flow through the bridged winding of incoming supervisory relay 708. Incoming supervisory relay 708 being a polarized relay, operates from this reverse current flow and at its contacts 1 operates incoming supervisory auxiliary relay 707. Relay 707 at its contacts 2 extend negative battery potential from current-limiting resistor 2713 through back contacts 2 of outgoing line relay 704 to wire 740 extending to trunk coupler 2051 over trunk wires L1 and L2. Incoming line relay 600 operates when the called party answers and at its contacts, operates incoming repeat relay 601. Relay 601 operates incoming hold relay 602, which at its contacts 2, extend ground potential through make contacts 3 of outgoing hold relay 605 to the winding of outgoing supervisory relay 607, operating it. At its contacts 1 and 2, outgoing supervisory relay 607 reverses the tip and ring conductors of outgoing trunk 2020–0 thereby furnishing answered supervision to the calling line. The calling subscriber may converse with the called subscriber.

Disconnect by the calling and called subscribers releases the apparatus used in the talking connection in preparation for another call.

IIIA2. *Station S1 on line 200 calls the operator at toll board TB*

If the calling station S1 on line 200 desires the operator in exchange B the initial digit "0" is dialed instead of the initial digit "8." This causes the common equipment of exchange A to extend the calling line to outgoing trunk 2020–0 extending to trunk coupler 2051 over conductors in cable K–2020–0. The line loop is bridged across the tip and ring conductors of outgoing trunk 2020–0 and is extended to battery and ground potential through the windings of outgoing line relay 604. The ring conductor of outgoing trunk 2020–0 is extended through break contacts 1 of toll discriminating auxiliary relay 2601 and through the winding of outgoing toll discriminating relay 2600. Relay 604 operates and operates outgoing hold relay 605 which, as previously described, extends negative battery potential from current-limiting resistor 613 to ground potential at back contacts 2 of incoming supervisory auxiliary relay 707 of trunk coupler 2052 through the windings of incoming line relay 600 and 700.

Outgoing toll discriminating relay 2600 operates in series with the lower winding of outgoing line relay 604. Make contacts on relay 2600 operate toll discriminating relay 2601 which at its contacts 2, lock to ground potential on wire 1640 and at its contacts 1 shunt the winding of outgoing toll discriminating relay 2600, thereby extending the calling line loop directly to battery and ground potentials through the winding of outgoing line relay 604. At its contacts 3, the charge on condenser 2614 is dissipated to battery through the winding of tone send relay 2602. Condenser 2614, when relay 2601 is in a restored condition, remains in a charged state from ground potential through current-limiting resistor 2613. The discharge current flow passing through the winding of tone send relay 2602 operates it and maintains it operated until condenser 2614 is completely discharged. At its contacts 1 and 2, tone send relay 2602 places a modulated tone, such as a 600 cycle tone modulated at a 120 cycles, through condensers 2630 and 2631 to the tip and ring conductors of trunk coupler 2051. This tone is passed by transformer action through the A and B windings of repeat coil 615 to the C and D windings and is further extended over trunk lines L1 and L2 to the C and D windings of repeat coil 715. By transformer action this tone if further extended through the A and B windings of repeat coil 715, through make contacts 1 and 2 of incoming cut-through relay and through back contacts 3 and 4 of series relay 706 to make contacts 1 and 2 of tone test relay 2703.

At the time that incoming hold relay 702 operated, its contacts 4 placed the charge on condenser 717 through back contacts 9 of outgoing hold relay 705 to the winding of tone test relay 2703, operating it. Tone test relay 2703 remains operated for the discharge time of condenser 717. During its operation, the tip and ring conductors are branched through its make contacts 1 and 2 and through condenser 2785 to tone receiver 2705. Tone receiver 2705 is so arranged that it will respond only to the desired modulated tone, such as the 600 cycle tone, modulated at 120 cycles. If there is a 600 cycle tone modulated at 120 cycles, tone receiver 2705 responds and operates incoming toll discriminating relay 2704. Relay 2704, at its contacts extend ground potential to the winding of toll control relay 710, operating it.

Tone test relay 2703 restores after condenser 717 discharges and restores tone receiver 2705, if operated. Incoming toll discriminating relay 2704 thereby restores and removes the ground potential from the winding of toll control relay 710, restoring it. However, contacts on toll control relay 710 placed ground potential through back contacts 4 of series relay 706 to the ring conductor of incoming trunk 2085–1 extending to incoming coupler 2500–I over conductors in cable K–2085–1. Since toll control relay 710 operated only momentarily, ground potential appeared on the ring conductor of incoming trunk 2085–1 only momentarily. This ground potential on the ring conductor is extended through break contacts 2 of back-bridge relay 2502 to battery through the lower windings of line relay 2503 and differential relay 2528. The upper windings of these relays are shunted by this ground, thereby permitting differential relay 2528 to operate, as the differential action of relay 2528 is effectively cancelled. At its contacts 1, relay 2528 extends ground potential to the winding of toll relay 2529, operating it. Toll relay 2529 locks operated through its contacts 1 to ground potential on wire 2519.

As previously pointed out, operation of toll control relay 2529 causes the ground potential to be extended from wire 2520 through make contacts 2 of toll relay 2529 to initial digit wire ID-10 extending to outgoing controller (not shown).

The outgoing controller causes the call to be directed to the toll operator at toll board TB over an outgoing trunk, such as outgoing trunk 9020-0 (Fig. 3) extending to trunk coupler 9001. As previously pointed out, trunk coupler 9001 signals the operator in the normal manner.

Answer by the operator closes the line loop across the tip and ring conductors of outgoing trunk 9020-0 extending to incoming coupler 2500-I. This closed line loop operates backbridge relay 2502, which at its contacts 1 and 2, reverse the tip and ring conductors extending to trunk coupler 2052. This reversal operates incoming supervisory relay 708, which as hereinbefore noted, furnishes answered supervision to the calling line.

Disconnect by the operator permits the apparatus used in the connection to be restored to normal use in preparation for another call.

IIIB. *Calls from exchange B to exchange A*

The operation of the system disclosed in the second embodiment of the invention, in extending a call from a subscriber in exchange B or the operator at toll board TB to a subscriber in exchange A, will now be described.

On calls from a subscriber at exchange B to a subscriber in exchange A, the seizing, signalling, and supervising are with negative battery potential pulsed in the normal way. However, on calls from the operator at toll board TB to subscribers in exchange A, timing in exchange A is to be disconnected. Therefore, the operator on originating a call, causes the associated trunk coupler 2052 to transmit a discriminating modulated tone to exchange A thereby identifying the call as one from a toll operator.

IIIB1. *Station S1 on line 1200 calls station S2 on line 210*

The subscriber at station S1 on line 1200, responsive to the removing of the receiver, causes the common equipment of the switchboard apparatus at exchange B to associate the calling line with a local block coupler such as local block coupler 1500-L. The dialing of the initial digit "3," assigned specifically to lines of exchange B cause the common equipment to extend the calling line to outgoing trunk 9020-3 extending to trunk coupler 2052 through conductors in cable K-9020-3. The calling line is bridged across the tip and ring conductors of outgoing trunk 9020-3 and is extended through the windings of outgoing line relay 704 to battery and ground potential.

Outgoing line relay 704 operates and extends ground potential to outgoing toll discriminating relay 2701, operating it. Responsive to the operation of relay 2701, its operating ground potential is extended through its make contacts 2 to the winding of outgoing hold relay 705, operating it. As previously described, operation of outgoing line relay 704 and outgoing hold relay 705 extends negative battery potential from current-limiting resistor 2713 through make contacts 8 of relay 705 and make contacts 2 of outgoing line relay 704 to ground potential through back contacts 2 of incoming supervisory auxiliary relay 609. This battery potential operates incoming line relay 600 of trunk coupler 2051, which at its contacts 1 operates incoming repeat relay 601. Relay 601 operates incoming hold relay 602 which at its contacts 2 operate incoming cut-through relay 603 and tone test relay 2603.

The dialing of the first digit of the directory number of the desired subscriber at station S2 on line 210 of exchange A opens and closes the line loop across the tip and ring conductors of outgoing trunk 9020-3. Outgoing line relay 704 restores and reoperates according to these openings and closings of the line loop and at its contacts 2, transmit pulses of battery potential and ground potential through the winding of incoming line relay 600 and 700. Incoming line relay 600 restores and reoperates according to these dial pulses and at its contacts, restores and reoperates incoming repeat relay 601. As relay 601 restores and reoperates, its contacts 1 open and close the line loop across the tip and ring conductors of incoming trunk 2085 extending to incoming coupler 1500-I over conductors in cable K-2085.

As this line loop across the tip and ring conductors of incoming trunk 2085 is opened and closed, line relay 1503 restores and reoperates and at its contacts 1, advance the digit register HR to a position corresponding to the hundreds digit dialed. As previously pointed out, battery potential from current-limiting resistor 612 is extended through contacts on incoming cut-through relay 603 to the sleeve conductor of incoming trunk 2085. At the same time, ground potential from back contacts 1 of units register UR is extended to the sleeve conductor, shunting the upper winding of discriminating relay 1526 preventing its operation.

As pointed out in the first embodiment of the invention, the dialing of the first digit, operates count relay 711, which at its contacts 1, open the locking circuit of the upper winding of toll discriminating relay 2701. The time interval required for the dialing of the first digit is sufficient for the switch-through ground on the sleeve conductor of outgoing trunk 9020-3 to disappear. Since the call is a local call, ground disappearing from the sleeve conductor of outgoing trunk 9020 causes current to flow through the lower winding of sleeve detector relay 2700. Relay 2700 operates and locks operated through its make contacts 2 to ground potential on locking wire 1732.

On the start of the second digit of the directory number, the locking circuit of the lower winding of outgoing toll discriminating relay 2701 is opened at make contacts 1 of outgoing line relay 704. However, the upper winding of relay 2701 is maintained energized from ground potential on locking wire 1732 through its contacts 1 and make contacts 1 of outgoing sleeve detector relay 2700, which operated since the call is from the local subscriber. Therefore, contacts 4 of relay 2701 maintain the operate circuit of tone send relay 2702 open.

As the second digit of the directory number is dialed, pulses of negative battery potential and ground potential are transmitted to trunk coupler 2051 of exchange A causing incoming line relay 600 to repeat these pulses to incoming repeat relay 601, which at its contacts 1, open and close the line loop across the tip and ring conductors of incoming trunk 2085. Line relay 1503 of incoming coupler 1500-I restores and reoperates accordingly and records the tens digit of the directory number on digit register TR.

On completion of the dialing of the succeeding digits of the directory number of the desired station S2 on line 210, break contacts 1 of units register UR, when it operated responsive to the dialing of the units digit, removes shunting ground potential from the upper winding of discriminating relay 1526. Relay 1526 operates from the battery potential from current-limiting resistor 612 and locks operated to ground potential on wire 1519. When stations register SR operates, responsive to recording the stations digit, its contacts 1 open one operate circuit of time pickup relay 1513, but since discriminating relay 1526 operated, the operate circuit of relay 1513 is closed through make contacts 1 of relay 1526. Conversation timing is therefore effective since the call is from a subscriber.

The common apparatus at the switchboard of exchange A extends the connection to line 210 and signals the called station S2 thereon.

Answer by the called party closes the line loop across the tip and ring conductors of line 210 thereby operating back-bridge relay 1502. Back-bridge relay 1502 at its contacts 1 and 2, reverse the tip and ring conductors of incoming trunk 2085 thereby causing a reversal of current flow thereover, operating incoming supervisory relay 610. Contacts 2 of relay 610 operate incoming supervisory auxiliary relay 609 which at its contacts 2 extend negative battery potential from current-limiting resistor 613 through break contacts 3 of toll control relay 608 to wire 640 extending to incoming line relay 600 of trunk coupler 2051 and incoming line relay 700 of trunk coupler 2052. Incoming line relay 700 operates responsive to this negative battery potential from trunk coupler 2051 and at its contacts operate incoming repeat relay 701. Relay 701 operates incoming hold relay 702 which at its contacts 3 extend ground potential through make contacts 6 of outgoing hold relay 705 to the winding of outgoing supervisory relay 709, operating it. Outgoing supervisory relay 709 at its make contacts 1 and 2 reverse the tip and ring conductors of outgoing trunk 9020-3 thereby furnishing the calling line with answered supervision. The calling party may now converse with the called party.

Disconnect by the calling and called parties returns the apparatus used in the extension of the connection to common use in preparation for another call.

IIIB2. *Operator at toll board TB calls station S2 on line 210*

As hereinbefore pointed out, the operator seizes toll coupler 3500-I and an outgoing trunk such as 9020-3 responsive to the dialing of the initial digit "3." The line loop is closed across the tip and ring conductors of outgoing trunk 9020-3 and, as previously described, operates outgoing line relay 704, outgoing hold relay 705, and outgoing toll discriminating relay 2701 of trunk coupler 2052. Make contacts 4 of outgoing toll discriminating relay 2701 place current-limiting resistor 2713 across condenser 2714, completely discharging it. Trunk coupler 2051 of exchange A is seized, operating incoming line relay 600, incoming repeat relay 601, incoming hold relay 602, and incoming cut-through relay 603. The operating ground potential for relay 603 is extended to the winding of tone test relay 2603, operating it. The winding of incoming supervisory relay 610 is extended over the tip and ring conductors of incoming trunk 2085 to battery and ground potential through the winding of incoming line relay 1503, seizing incoming coupler 1500-I. As previously pointed out, seizure of incoming coupler 1500-I operates line relay 1503, release relay 1505, and series relay 1504.

The dialing of the first digit of the directory number of the desired subscriber S2 on called line 210 of exchange A by the operator, opens and closes the line loop across the winding of outgoing line relay 704 causing it to extend pulses of negative battery potential and ground potential to exchange B over trunk wires L1 and L2, thereby restoring and reoperating incoming line relay 600. Incoming line relay 600 causes incoming repeat relay 601 to follow these pulses of battery and ground potential and restore and reoperate line relay 1503 to record the hundreds digit of the directory number on the hundreds register HR.

On completion of the dialing of the first digit of the directory number, the operate circuit for the upper winding of outgoing toll discriminating relay 2701 is opened at make contacts 3 of relay 706, break contacts 1 of count relay 711 and at make contacts 1 of sleeve detector relay 2700. Since the call is from a toll operator through a toll coupler, such as toll coupler 3500-I, ground potential is projected ahead on the sleeve conductor of outgoing trunk 9020-3 and shunts the lower winding of relay 2700, preventing its operation.

At the start of the dialing of the second digit of the directory number, outgoing line relay 704 repeats these dial pulses to the apparatus of exchange A, according the digits on the respective digit registers in block coupler 1500-I.

On the first restoration of outgoing line relay 704, ground potential is removed from the lower winding of outgoing toll discriminating relay 2701, which is fast acting and restores. Contacts 4 of outgoing toll discriminating relay 2701 places one side of discharged condenser 2714 to open contacts 7 of series relay 706.

On completion of the dialing of the second digit of the directory number, with outgoing toll discriminating relay 2701 restored, condenser 2714 has one side connected through break contact 7 of series relay 706 to ground potential through the winding of tone send relay 2702. Condenser 2714 becomes charged and the charging current flow through the winding of tone send relay 2702 operates it. When condenser 2714 is fully charged tone send relay 2702 restores.

On completion of the dialing of the second digit, series relay 606 of trunk coupler 2051 restores responsive to the reoperation of incoming repeat relay 601. As previously pointed out, tone test relay 2703 is in an operated condition and its contacts 1 and 2 and break contacts 3 and 4 of series relay 606, associate tone receiver 2605 with the tip and ring conductors of incoming trunk 2085 in preparation for tone tests.

Operation of tone test relay 2703 from the charging current of condenser 2714, places a modulated tone, such as 600 cycles modulated at 120 cycles, through its make contacts 1 and 2 and through the A and B windings of repeat coil 715. This tone is induced in the C and D windings of repeat coil 715 and is extended over trunk line wires L1 and L2 to the C and D windings of repeat coil 715 of trunk coupler 2051. By transformer action this tone is further induced in the A and B windings of repeat coil 615, and extended through make contacts 1 and 2 of incoming cut-through relay 603, through break contacts 3 and 4 of series relay 606 and through make contacts 1 and 2 of tone test relay 2603 to tone receiver 2605 through condenser 2685. Tone receiver 2605 responds to the modulated tone by operating toll discriminating relay 2604. Contacts on relay 2604 operate toll control relay 608 which locks operated to ground potential at make contacts 2 of incoming hold relay 602 through break contacts 3 of outgoing hold relay 605. At its contacts 1, toll control relay 608 places ground potential on the sleeve conductor of incoming trunk 2085 extending to incoming coupler 1500–I. This ground potential shunts the upper winding of discriminating relay 1516.

On completion of the dialing of the remaining digits, condenser 2714, being fully charged, does not reoperate tone send relay 202 on each restoration of series relay 706.

On the start of the dialing of the units digit of the directory number, units register UR, of incoming coupler 1500–I, operates and at its contacts 1, removes ground potential from the sleeve conductor of incoming trunk 2085. However, ground potential from make contact 1 of toll control relay 608 is present on the sleeve conductor and maintains discriminating relay 1526 shunted, preventing its operation. At make contacts 1 of relay 1526, the operate circuit of time pick-up relay 1513 is opened, thereby preventing timing on calls from a toll operator.

On completion of the dialing of the last digit of the directory number of the desired subscriber S2 on line 210, the switchboard apparatus of exchange A extends the call to the desired line and signals station S2 thereon.

When the calling party answers, the line loop is closed across the tip and ring conductors of incoming trunk 2085, thereby operating incoming supervisory relay 610 of trunk coupler 2051. Relay 610 operates relay 609, which at its contacts 2, extend negative battery potential from current-limiting resistor 613 to wire 640 extending to exchange B. Incoming line relay 700 thereupon operates and at its contacts operate incoming repeat relay 701. Incoming repeat relay 701 operates incoming hold relay 702, which at its contacts 3 operates outgoing supervisory relay 709. Contacts 1 and 2 of outgoing supervisory relay 709 reverse the tip and ring conductors of outgoing trunk 9020–3 extending to the toll operator. This reversal furnishes the toll operator with answered supervision. The called party may now converse with the toll operator.

Disconnect by the toll operator returns the apparatus used in the connection between the toll operator and desired subscriber to common use in preparation for another call.

As hereinbefore pointed out, a toll call from exchange C reaches outgoing trunk 9020–3 in a manner similar to a call from the toll operator at toll board TB. Ground from the toll coupler associated with the toll operator at exchange C projects ground ahead on the sleeve conductor of outgoing trunk 9020–3 thereby causing trunk coupler 2052 to cancel the timing in exchange A.

I claim:

1. In a multi-exchange dial telephone system, a first and a second exchange and an interexchange trunk interconnecting them, a group of outgoing trunks and a group of terminating trunks in the second exchange having respective group-designation members assigned thereto, first and second switching means in the second exchange, means in the first exchange responsive to the dialing of either designation number for extending a connection to the first switching means of the second exchange over the interexchange trunk, means in the first exchange for transmitting one signal or another to the second exchange depending upon the designation number dialed, means in the second exchange responsive to one said signal for selectively controlling the first switching means and the second switching means to thereupon extend the connection to an idle trunk of the outgoing group, means in the second exchange responsive to the other said signal for executing a preparing operation, and means in the second exchange responsive to further dialing over the interexchange connection following said preparing operation for selectively controlling the first switching means and the second switching means to extend the connection to an idle terminating trunk.

2. In a multi-exchange telephone system, a first and a second exchange and an interexchange trunk interconnecting them, a direct-current control path over said trunk from the first exchange to relay apparatus of the second exchange, current sources of two polarities in the first exchange, means in the first exchange for extending a connection of either of two classes over the trunk line to the second exchange, connecting means in the first exchange for connecting one or the other of said current sources to said path according to the class of the connection and for maintaining it connected to provide a continuous flow of control current thereover of a corresponding polarity, means in the second exchange controlled over said path for marking the class of the extended connection according to the polarity of the current flow over said path, means in the first exchange for producing momentary interruptions in said path to transmit digit information to the second exchange, means in the second exchange responsive thereto for further extending the connection to a called line, means in the first exchange for severing the connection thereat and for opening said path, and means in the second exchange responsive to the opening of said path for clearing out the connection extended therein.

3. In a multi-exchange telephone system according to claim 2, the said connecting means in the first exchange including means for initially connecting a predetermined one of said current sources to said path irrespective of the class of the connection, identifying means in the first exchange for thereafter identifying the class of the connection, and means responsive to the transmission of a portion of said digit information for resetting said connecting means to substitute the other current source subject to said identifying means having identified the connection as being of a predetermined one of the two classes.

4. In a multi-exchange telephone system according to claim 2, means for operating said connecting means initially to connect a predetermined one of said current sources irrespective of the class of the connection, and means responsive to the action of the means for producing said momentary interruptions for reoperating said connecting means to substitute the other said current source subject to the connection being of a predetermined one of said classes.

5. In a system according to claim 4, means for insuring that said substitution occurs at a time when the said path is interrupted pursuant to the transmission of digit information, whereby the incidental transmission of an undesired signal is prevented.

6. In a multi-exchange telephone system according to claim 2, current sources of two polarities in the second exchange, means in the second exchange for connecting either current source to said path to transmit a supervisory signal back to the first exchange, and means for predetermining which of the last said sources is connected depending upon which of the current sources in the first exchange is connected thereto.

7. In a multi-exchange telephone system, a first and a second exchange and an interexchange trunk interconnecting them, a direct-current control path and an alternating-current class-signalling path over said trunk, a direct-current source and an alternating-current source in the first exchange, means in the first exchange for extending a connection of either of two classes over the trunk line to the second exchange, connecting means in the first exchange for connecting the direct-current source to the said control path and for maintaining it connected to provide a continuous flow of control current thereover, means in the first exchange for determining the class of the connection and for connecting the alternating current source to the said class-signalling path dependent on the connection being of a predetermined one of said classes, means in the second exchange controlled by alternating current over said class-signalling path for marking the class of the extended connection, means in the first exchange for producing momentary interruptions in the said control path to transmit digit information to the second exchange, means in the second exchange responsive thereto for further extending the connection to a called line, means in the first exchange for severing the connection thereat and for opening said control path, and means in the second exchange responsive to the opening of said control path for clearing out the connection extended therein.

References Cited in the file of this patent

UNITED STATES PATENTS

| Number | Name | Date |
|---|---|---|
| 2,228,354 | Jauch | Jan. 14, 1941 |
| 2,376,771 | Hartley | May 22, 1945 |
| 2,398,854 | Ray | Apr. 23, 1946 |
| 2,495,191 | Wallace | Jan. 17, 1950 |
| 2,516,645 | Powell | July 25, 1950 |

OTHER REFERENCES

Telephony, Atkinson, vol. II, pages 464, 466, 1948.